(12) United States Patent
Albelo et al.

(10) Patent No.: US 10,386,489 B2
(45) Date of Patent: Aug. 20, 2019

(54) BEAM SCANNER FOR AUTONOMOUS VEHICLES

(71) Applicants: Jeffrey Albelo, Portland, OR (US); Joseph LaChapelle, Philomath, OR (US)

(72) Inventors: Jeffrey Albelo, Portland, OR (US); Joseph LaChapelle, Philomath, OR (US)

( * ) Notice: Subject to any disclaimer, the term of this patent is extended or adjusted under 35 U.S.C. 154(b) by 352 days.

(21) Appl. No.: 15/421,701

(22) Filed: Feb. 1, 2017

(65) Prior Publication Data

US 2018/0217262 A1    Aug. 2, 2018

(51) Int. Cl.

| | |
|---|---|
| *G01S 17/93* | (2006.01) |
| *G01S 17/02* | (2006.01) |
| *G01S 7/484* | (2006.01) |
| *G01S 17/42* | (2006.01) |
| *G01S 7/481* | (2006.01) |

(52) U.S. Cl.
CPC ............ *G01S 17/936* (2013.01); *G01S 7/484* (2013.01); *G01S 7/4814* (2013.01); *G01S 7/4816* (2013.01); *G01S 7/4817* (2013.01); *G01S 17/026* (2013.01); *G01S 17/42* (2013.01)

(58) Field of Classification Search
CPC ...... G01S 17/89; G01S 7/4817; G01S 7/4811; G01S 7/4818
See application file for complete search history.

(56) References Cited

U.S. PATENT DOCUMENTS

| | | | |
|---|---|---|---|
| 2007/0058686 A1* | 3/2007 | Capasso ................. | B82Y 20/00 372/43.01 |
| 2012/0212375 A1* | 8/2012 | Depree, IV ............ | B82Y 10/00 343/700 MS |
| 2017/0365970 A1* | 12/2017 | Uyeno ................... | H01S 3/0071 |
| 2019/0025430 A1* | 1/2019 | Rohani ................... | G01S 17/89 |

* cited by examiner

*Primary Examiner* — Luke D Ratcliffe
(74) *Attorney, Agent, or Firm* — Mark S Hubert

(57) ABSTRACT

A light beam steering transmissive element with an arbitrarily sized aperture comprising at least one layer of a insulating matrix modified for increased polarizability under electrical, magnetic or optical stimulation, between two or more substrates that can be electrically configured to provide signal modulation (optical, magnetic or electrical) that will control the wavefronts of incident light, thereby taking off-axis electromagnetic signals and aligning them to the aperture of a receiving element positioned near the device, or the reverse, sending signals originating behind the steering device to a variety of user-defined angles in two or more dimensions.

25 Claims, 16 Drawing Sheets

BEAM SCANNER FOR AUTONOMOUS VEHICLES

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to a vision system for the transmission and reception of LIDAR signals, and more particularly directed for use in the navigation systems of autonomous vehicles.

BACKGROUND

Autonomous vehicles are now reality on the battlefield and widespread acceptance and implementation are on the immediate horizon in other theaters of operation. The accuracy and precision of these self-driving systems depend upon the footprint or map of the area and objects in the vicinity of the vehicle whether moving or stationary. For optimal performance and safety, the field of view seen should be as wide as possible and should be able to be sampled at an extremely high frequency.

All autonomous vehicles have three cooperating systems. The vision system, which senses and interprets the distance between objects and the vehicle, the analytics system, which receives the visions system's constantly updating signals and performs speed and distance analysis via its software algorithms to generate a picture of the surrounding environment, and the control architecture system which receives inputs from the analytics system and converts them into mechanical actions of the vehicle such as steering, braking and acceleration.

The prior art vision systems vary in their theory of operation, however all send a signal and receive a reflected signal from which a composite image of size, shape and distance is compiled. It is this signal that is sent further to the analytics system for processing to generate vehicle control outputs to the control architecture system to safely guide the vehicle. Commonly utilized automobile vision systems embody electromagnetic radiation signals, such as can be found in LIDAR (Google), Radar (Tesla) and multi wavelength composite imaging (various small startup companies). All of these utilize some type of microprocessors running image processing software as part of the analytic system. However, none of these are particularly well suited to operating the self-driving vehicle with any degree of safety for two reasons: First, the frequency of their scans is too low, and second, their field of regard (also called instantaneous field of view, IFOV) is limited. This is also the case for unmanned aerial vehicles (UAVs) and semi- or fully autonomous driver assistants (ADA) presently in use.

While it may be theoretically possible to modify the current prior art systems to have a higher scan frequency and a larger field of regard, this would require a substantial input of energy as these systems utilize mechanical beam steering elements that operate either through movable deflection, MEMS devices or small rotating mirrors (galvanometer and rotating polygon systems). Any improved systems would have to be physically larger (and heavier), and would require much faster movement of the equipment to accomplish the desired, faster scan rate; this is a serious detriment to all vehicles, especially those that are fully electric.

Henceforth, an improved vision system of self-driving vehicles, having a low power consumption, a large field of regard (as close to 180 degrees in flat applications and 360 degrees in cylindrical applications), and extremely fast scan speeds (in excess of 75 KHz). would fulfill a long felt need in the autonomous vehicle industry. Although the transportation industry is only recently focused on autonomous modes of operation, the military has long been studying these and related problems. This new invention utilizes and combines known and new technologies in a unique and novel configuration to overcome the aforementioned limitations of the extant technology.

BRIEF SUMMARY

In accordance with various embodiments, an operational guidance or vision system for a autonomous vehicle is provided. It will have low power consumption, a large field of regard and a very high sampling rate; much faster than liquid crystal systems.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

Figure 1:
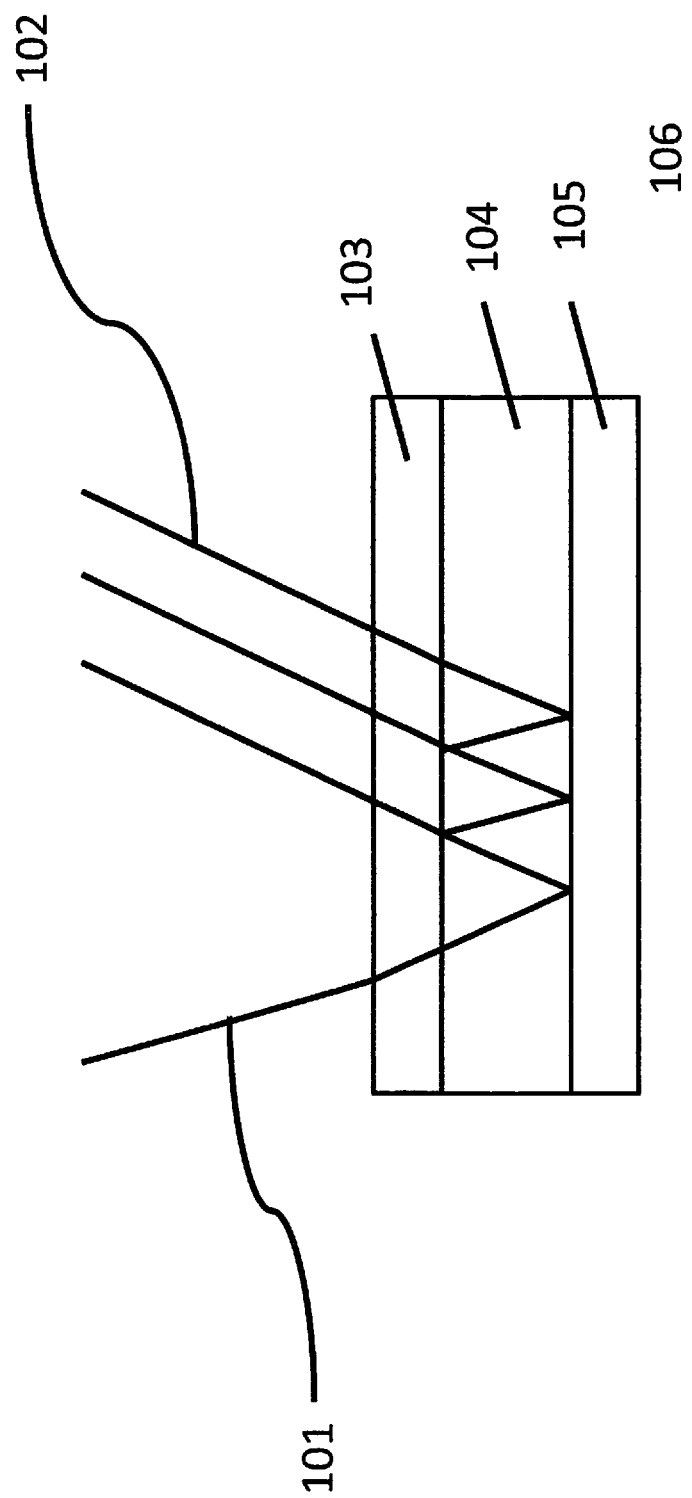
FIG. 1 is a conceptual representation of prior art reflective mode modulation beam steering, typically employed in telecommunications applications where the optical modulation is affected by a variety of materials, but the aperture for sending and receiving signals is less than 10 cm.
Figure 2:
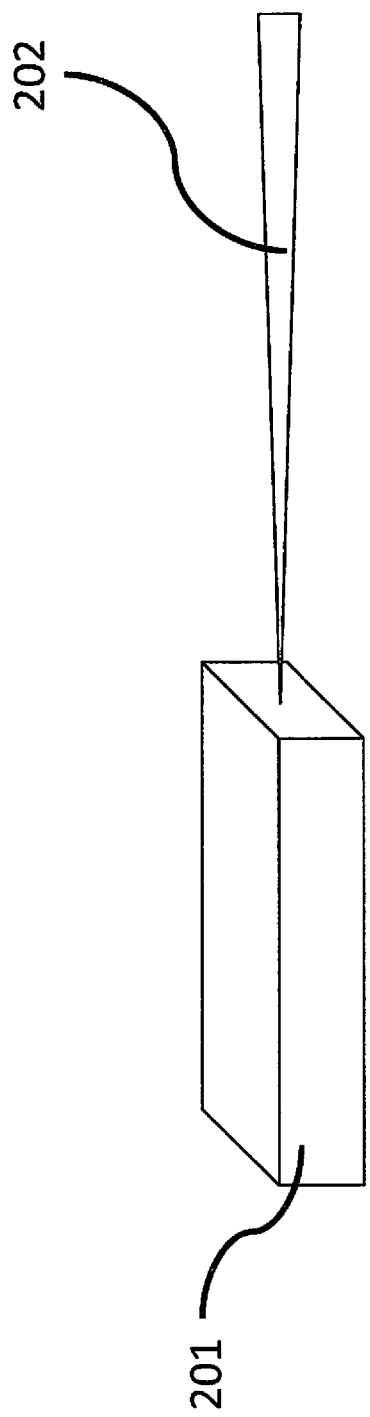
FIG. 2 is a conceptual representation of prior art transmissive modulation typically deployed as waveguides of exceedingly narrow aperture and IFOV.

While various aspects and features of certain embodiments have been summarized above, the following detailed description illustrates at least on exemplary embodiment in further detail to enable one skilled in the art to practice such an embodiment. The described example is provided for illustrative purposes and is not intended to limit the scope of the invention.

In the following description, for the purposes of explanation, numerous specific details are set forth in order to provide a thorough understanding of the described embodiment/s. It will be apparent to one skilled in the art, however, that other embodiments of the present invention may be practiced without some of these specific details. Certain structures and devices may be shown in block diagram form. While various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The term "series of particles", "particles", "system(s) of particles" or as used herein refers to a grouping of elements including molecules, molecular clusters, ions, agglomerated particles, nano clusters, individual nano particles, quantum dots, clusters of quantum dots and carbon nano tubes, whether having an induced or permanent dipole moment, or not that can be electrically addressed for use in creating either a sequential or a random access pointing system.

As used herein the term "vision system" refers to component of an automated operational navigation system for vehicles. The vision system uses electromagnetic signals to collect detection and ranging data for objects or the lack thereof in the vicinity of a vehicle. Signals thus collected are passed to the downstream analytical components of the automated navigation system. The vision system means, comprises and encompasses the "transmit" or sending application of the present invention and/or the "receive" or receiver portion of the present invention. In either case or the case where the two are deployed together as an integrated solution, both units are tied to the scanning of a beam, the steering of a beam to a random point or the interrogating of a given random point within a given field of view.

As used herein the terms "transmit" and "receive" mean emitting or absorbing all or a portion of any electromagnetic signal by equipment used for detection and ranging applications.

As used herein the terms "lens" and "collecting optic" refer to any optical element interacting with electromagnetic signals as they pass to or from the emitter or detector components functioning as any one or all of the following, alone or in concert: refractive, diffractive or reflective optical element(s).

As used herein the term "arbitrary size" refers to a grouping of all possible sizes as used with respect to "particles" present in the devices described herein. The sizes can exist of any range, but the optimal results occur when the particles are distributed over a narrow size distribution, typically less than 200 nm.

As used herein the term "partially conductive substrate plate" refers to a grouping of all possible substrate materials that are by nature or can be rendered conductive to electrical, thermal, magnetic or optical signals for use in affecting the local electronic environment within, on, or next to the substrate plate used in beam scanning/beam steering applications.

As used herein, the term "signal" refers to both the plural and singular form of the word. i.e. signal and signals, and refers to any electromagnetic wave or particle generated within, on, in, in the vicinity of, or near the operational guidance system and its sub systems or components.

As used herein, the term "field of view" means any grouping of points that can be illuminated by the emitted beam of the guidance system, the points can be either consecutively or randomly addressed or interrogated.

A used herein the term "substantially transparent" means capable of passing more than 5% of the incident radiation.

As used herein the term "partially conductive" with respect to the substrate plate, means capable of sending or receiving a signal through, from or over a metallic, dielectric or semiconducting material, which could comprise any of a number of materials, including, but not limited to, glass, polymers, gels, ceramics, organic molecules, carbon in any form, crystalline or amorphous materials or mixtures, layers or stacks thereof.

As used herein the term "induced dipole moment" refers to any number of charges that can be placed into, on, through or near any "particle(s)" resulting in a user controllable change in the polarizability of the particle, local environment or dielectric substrate after the receipt of an external signal containing said charge or triggering its release.

As used herein the term "permanent dipole moment" refers to a dipole or charge that persists without any external control input.

As used herein, the term "dipole" refers to any electrical point or area charge localized on, in or near a particle in the beam scanning or beam steering device.

As used here the term "beam scanning" and/or "beam steering" refers, interchangeably, to any modification, by reflection, refraction, or any change in the electronic environment of an incoming or outgoing electromagnetic signal that results in a change in the direction of the wave or particle, particularly when the degree and direction of the change can be generated, determined or predetermined via the application of any external control signal.

As used herein, the term "communicating" refers to moving a signal along the chain of component parts without regard to the precise nature of the conveyance, for example in an optical context, "communicating said collected electromagnetic signal pulse to or into said receiver", simply means delivering the signal, either directly by focusing or into the aperture of a delivery fiber or other optical conveyance to ensure its arrival into the detection mechanism.

As used herein, the term "collected" refers to the absorption or direction of any portion of an electromagnetic signal for the purpose of relaying said signals to a detection apparatus or subsystem, which could be a semiconducting element, a diode or any other detection scheme commonly employed.

As used herein, the term "processing" or "signal processing" refers to any algorithmic treatment applied to data generated by and/or collected by the operational guidance system, including computational image analysis, rate, distance and vector information comparisons. The term also means any treatment, mathematical or otherwise, applied to any data stream associated with the guidance system.

As used herein, the term "operational guidance system" means the set of components required for the autonomous or semi-autonomous control of a moving vehicle; a computerized control system for pilotless operation of a vehicle, comprising optics, lenses, beam scanners, beam steering modules, emitters and detectors, alone or in concert with signal processing units and driver circuits; also referring to the same deployed in a vehicle either as an integrated system from a manufacturer or a stand alone system for modifying vehicle operation from an after-market point of view.

As used herein, the term "drive signal" refers to the set of control inputs generated by a guidance system in response to data generated by or collected by components of the guidance system as well as those required for generation or detection of electromagnetic pulses.

As used herein, the term "controller", "external control signal" and "control signal" refer to the signals responsible for determining the pointing direction of any element or the entire beam steering/scanning apparatus.

As used herein, the term "moving parts" refers to any component(s) that must change physical position or orientation to affect a change in an electromagnetic signal.

As used herein, the terms "MIXSEL", "VCSEL", "VECSEL" each refer to specific types of semiconductor lasers also collectively referred to as optically pumped semiconductor lasers or semiconductor disk lasers. More generally the term laser, fiber laser, or diode laser as used herein comprise the set of all lasers regardless of lasing medium capable of generating pulses of electromagnetic radiation, either as single pulses emitted at a frequency or as a burst of pulses where the pulse is actually a collection of sub-pulses, with each sub-pulse to sub-pulse temporal spacing being less than 100 ns.

The present invention relates to a novel design for a vision system for an autonomous vehicle, completely different from anything done before because it removes limitations imposed by the approaches previously undertaken. In the way of further understanding the prior art, the following provides additional background into the prior art, pointing out its shortcomings and where the prior art rigidly stuck to its dogma.

Figure 3:
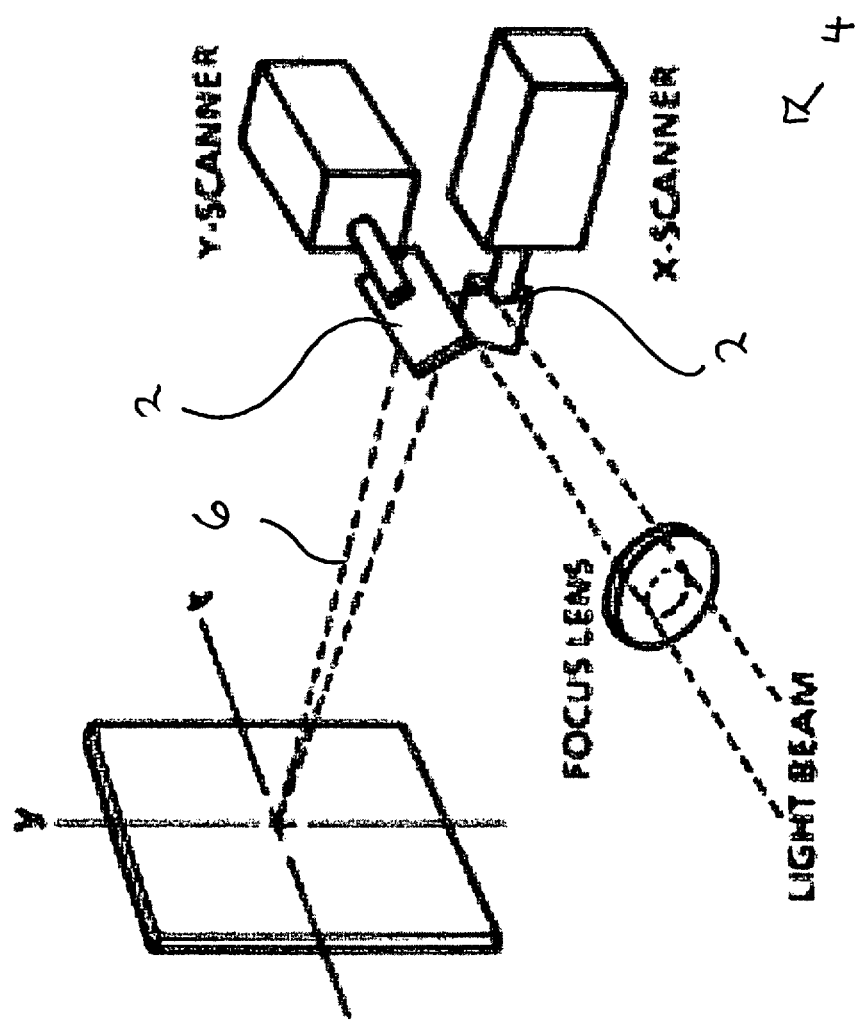
FIG. 3 is a conceptual representation of prior art Galvo scanning unit.

Light beam steering or scanning is important for use in all current vision systems for autonomous vehicles. All of these applications use mechanical beam steering devices to steer electromagnetic beams 6 either through movable deflection, MEMS devices or rotating mirrors 2 (galvanometer and polygon systems) as suggested in the light beam steering system 4 of FIG. 3. The challenge for non-mechanical beam steering is that, for many applications, one desires to steer the beam through a large angle (45° or more) and to have reasonably large apertures (5 cm or more IFOV). This implies a very large number of steering states (defined in one dimension as the total steering angle divided by the diffraction-limited angular spot size). This implies the ideal solution for high speed, high angle, non-mechanical beam steering will have many steering devices to provide those steering states or a dispersion of discrete elements across the optical field that can be individually and multiply addressed through an electrical signal to provide the required states, but also with a large aperture and a very fast refresh rate in order to accommodate frequencies greater than 100 kHz.

Related to the number of steering states is the Lagrange invariant. This invariant is a property of the optical system and does not change with propagation through the system, including components like telescopes, and other lenses. At a pupil plane (in air), the Lagrange invariant is defined as the product of the radius of the pupil times the tangent of the maximum steering half-angle. Hence, for the specifications above, Lagrange invariants on the order of 2.5 cm or larger are of interest. To achieve this value, non-mechanical steering with at least two stages or ranges is needed: a large-angle discrete steering stage and a small-angle continuous steering stage as suggested in U.S. Pat. No. 5,093,740.

The physics of non-mechanical beam steering can be understood by considering the effect of a prism on an incident beam normal to a surface. The index of refraction in a prism is larger than that of air, so light travels more slowly within the prism. The angle of light passing through a prism will be changed because the light moving through the thick portion of the prism will be delayed compared to light traveling through the thin portion. Steering can be accomplished by changing the thickness of the prism. Light could be steered electronically by writing a prism. The problem is that it is difficult to create an optical path difference (OPD) as large as would be required to write a full prism of appreciable width. For example, a 10-cm-wide aperture steering to 30° would require >5 cm OPD on the thick side of the prism.

For example, phased array microwave radars steer to angles larger than 45°. To do this, the radars use individual radiators that are at a half-wavelength spacing or closer. Overcoming such a limitation would provide a novel approach to the design of a new vision system for autonomous vehicles of every ilk.

In radar, the conventional discussion of half-wavelength spacing says individual phase adjustable radiators must be no larger than half-wavelength to reduce grating lobes after J. Frank, et al., *Radar Handbook* Merrill Skolnik, 3e, McGraw-Hill, pp. 13.2-13.3, (2008). This is a different view of the same physics about which the present innovation is concerned.

There are many challenges to creating a reliable, economical and robust solution to beam steering and a number of interesting solutions have been proposed; of those that have been proposed to solve the problems associated with mechanical scanning systems, none have truly demonstrated broad-based applicability to the scanning market and certainly fewer have been adopted in commercial systems. Beam steering using rotating mirrors is by far the most widely adopted solution, L. Bieser, et al, *Handbook of Optics*, vol. 2, ch. 19, (1994). Unfortunately, rotating scanning mirrors are not suitable for compact optical systems and are inherently prone to acceleration sensitivity, limiting their application to substantially stationary, highly vibration isolated systems or systems with extremely high scan rate requirements, greater than 75-100 kHz, depending upon the payload. Although many advances have been made over the last 35 years, currently available devices can only offer binary beam steering or those that are limited in speed and/or clear aperture. Additionally all of these systems suffer from significant power requirements to operate them, further limiting their applicability.

Rather than move a mirror, which requires acceleration and deceleration time, the ideal solution is to simply steer a light beam without use of a mechanical element. Direct light control can be achieved through any number of means, but each scheme imparts limitations to its broad application due to cost or performance. Light can be thus controlled utilizing waveguides. For instance, U.S. Pat. No. 5,347,377, entitled "Planar Waveguide Liquid Crystal Variable Retarder" relates generally to providing an improved phase delay device designed to change wavefront directions by applying alternating currents signals between 2 and 50 volts rms. The disclosure teaches changing phase delay for only TM polarized light. These limitations are overcome in U.S. Pat. No. 9,366,938 B1, which teaches the use of a liquid crystal (LC) enhanced waveguide modulation achieved through use of direct current signals applied to a conductive substrate. This device makes use of LCs that have by far the largest electro-optic response of any known materials, $10^5$ times larger than that of lithium niobate, for instance, in this new configuration. Rather than transmit the light through the LC material, usually less than 20 um thick, the LC material acts as a cladding for a waveguide material.

The evanescent field of the guided light wave extends into the adjustable-index LC cladding. This rather clever adaptation selectively employs the well-ordered LC-surface region that provides low scattering losses (less than 0.5 dB/cm) and fast response times (10-500 μS), while avoiding any interaction that is coupled to LC thickness, which avoids limitations imposed by short LC interaction length and slow relaxation times. In spite of all of this, this solution is only optimized for transmission applications, with the proviso that the input beam diameter is quite small and well ordered. This device architecture is limited to narrow beam diameter and therefore suffers from large divergence in low signal/noise environments, to say nothing of applications in so-called single photon detection applications. This limits the applications of this invention to sending applications where beam scanning is desirable.

For some time, Bieser et al, SPIE Milestone Series, vol. 378 (1985), have made a large effort to overcome the limitations of mechanical, acousto-optic and LC based beam deflectors using solid electro-optic (EO) crystals. These are characterized as having a refractive index (RI) that changes in response to an applied electric field. The change with E field can be linear (Pockels Effect) or quadratic (Kerr Effect). There are a number of different schemes that have been proposed. Many of these are based upon the principle of linear variation in index causing the wavefront of coherent radiation thus incident to be bent in the direction of increasing index. Presently, devices constructed to render this effect are either slow due to mechanical components and limitations, limited in aperture with small angles of regard or limited in scanning speed due to relaxation characteristics, i.e. LC materials, which while very versatile, are effectively useless at scan rated approaching 100 kHz.

U.S. Pat. No. 3,357,771 to Buher et al. discloses a beam deflector comprising an elongated bulk crystal of linear electro-optic effect potassium dihydrogen phosphate encased on two opposite elongated sides between hyperbolically shaped dielectric blocks, which are in turn coated with conductors such that, when an AC voltage is applied to the conductors, a linear electric field variation occurs in the crystal causing the desired linear variation RI. Most bulk crystal solutions require significant voltage to drive desired deflections, say 150V for a 2.34°, making them impractical for portable or electric vehicle applications, even if the aperture could be arbitrarily large, which is not the case.

Another approach by Watanabe, et al. covered in U.S. Pat. No. 4,343,536 uses dual arrays of interdigitated electrodes on one surface of an elongated crystal. AC voltages thus applied, particularly in the MHz range, produce an effect, while not exactly linear, that induces a nevertheless controllable deflection of a light beam. The device patent works with a large number of materials and is incorporated herein by references for such teachings. The aforementioned device and many others like it, which utilize elongated media, suffer from polarization sensitivity, making them wholly unsuitable for reflected light applications.

For large beam diameters, U.S. Pat. No. 3,787,111 discloses a device comprising a layer of strontium barium niobate on a transparent substrate. A closely-spaced array of linear stripe electrodes is deposited thereon. Independent voltage signals are then used to locally change the RI under each electrode, creating in the perpendicular direction to the electrodes an approximately linear change in RI. A light beam whose diameter is large compared to the electrode spacing will be deflected as it travels through the medium, will be deflected in a direction also perpendicular to the electrodes. In order to be most successful, this approach requires electrode spacing, which is small compared to the wavelength of the light. U.S. Pat. No. 5,093,747 provides further insight into devices of this construction. If the electrode spacing is not small, diffraction effects occur creating lobes off the main beam. This effect was used to some advantage in U.S. Pat. No. 4,639,091, by Huignard et al.

In addition to light transmitted though a layered device, such as that described in U.S. Pat. No. 6,317,251 B1, where the light is reflected after transiting the programmable layers, purely reflective deflection is possible in two dimensions, FIG. 1. The incoming beam (101) can be repeatedly reflected and steered (102) through a variety of material that conduct (103) are transparent (104) and have large index changes at the interfaces (105) with nearly equivalent performance. The requirements for reflective mode device operation are necessarily limiting in that the desired effect can only be applied in high signal to noise environments and makes receiving of low intensity, long distance return pulses (>150 m beam path) nearly impossible, to say nothing of highly limited field of regard or IFOV.

More recently electro optical materials have been extended into the polymer space, where a layered structure of support materials and a polymer matrix is utilized to effect beam steering. W. Wang, et al., report in *Sens Actuators A Phys.* pp. 1570-73, (2011) improvements have been made in reducing the applied voltage required to gain the desired EO response. Many EO polymers have been modified via additives and indeed structured to enhance their respective EO response by virtue of creating easily polarizable moieties on long-chain backbones, the innovation in Wang et al., relates to the use of a thermoplastic material and multi-stage prisms fabricated therefrom to achieve 29° deflection angle, which is notable for devices of this construction. This is limited in scaling and linearity of signal response across the field of regard.

Figure 6:
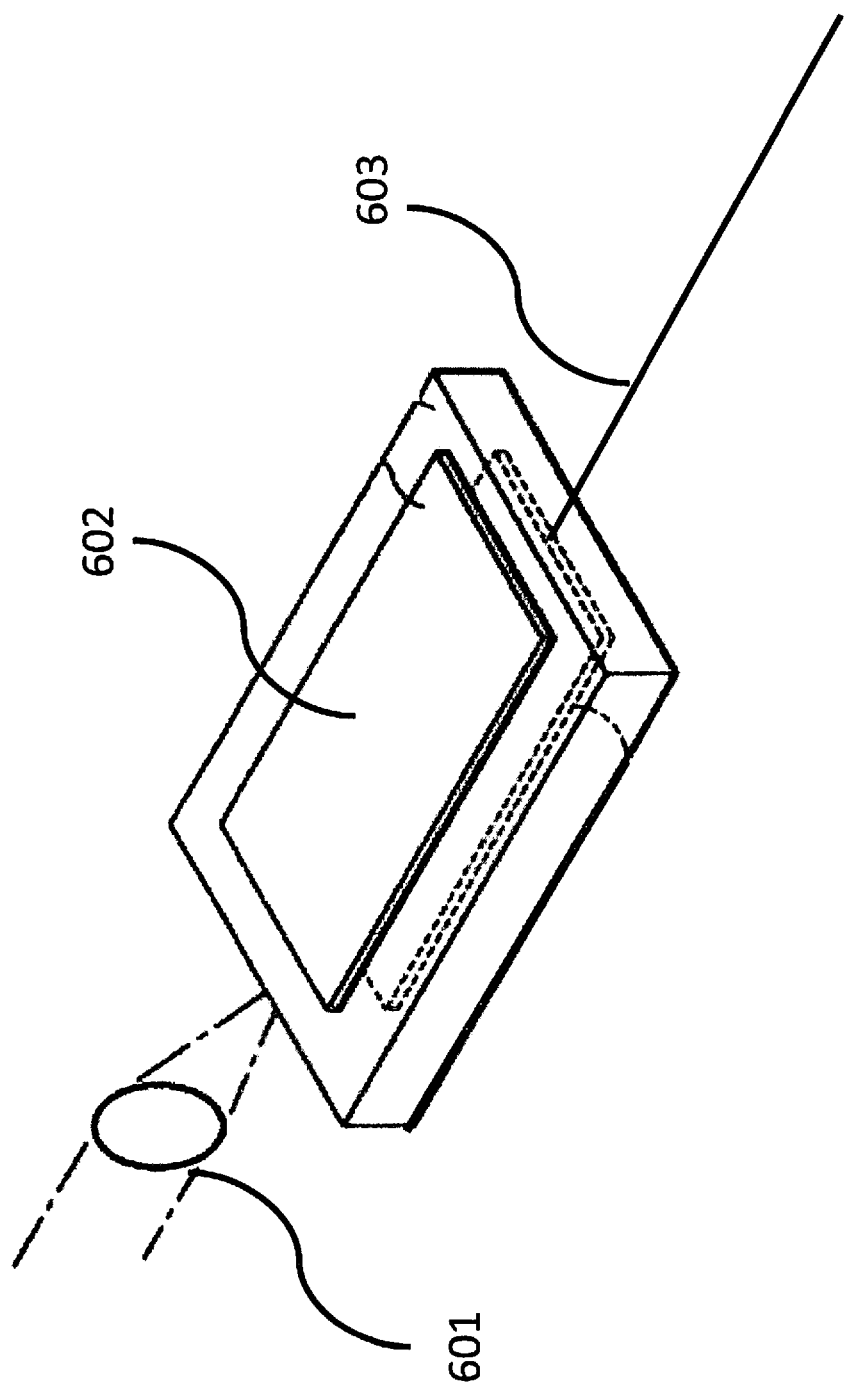
FIG. 6 is a conceptual representation of a prior art monolithic semi conductor beam steering device using an evanescent field having low scan speed, small aperture and narrow field of regard.
Figure 7:
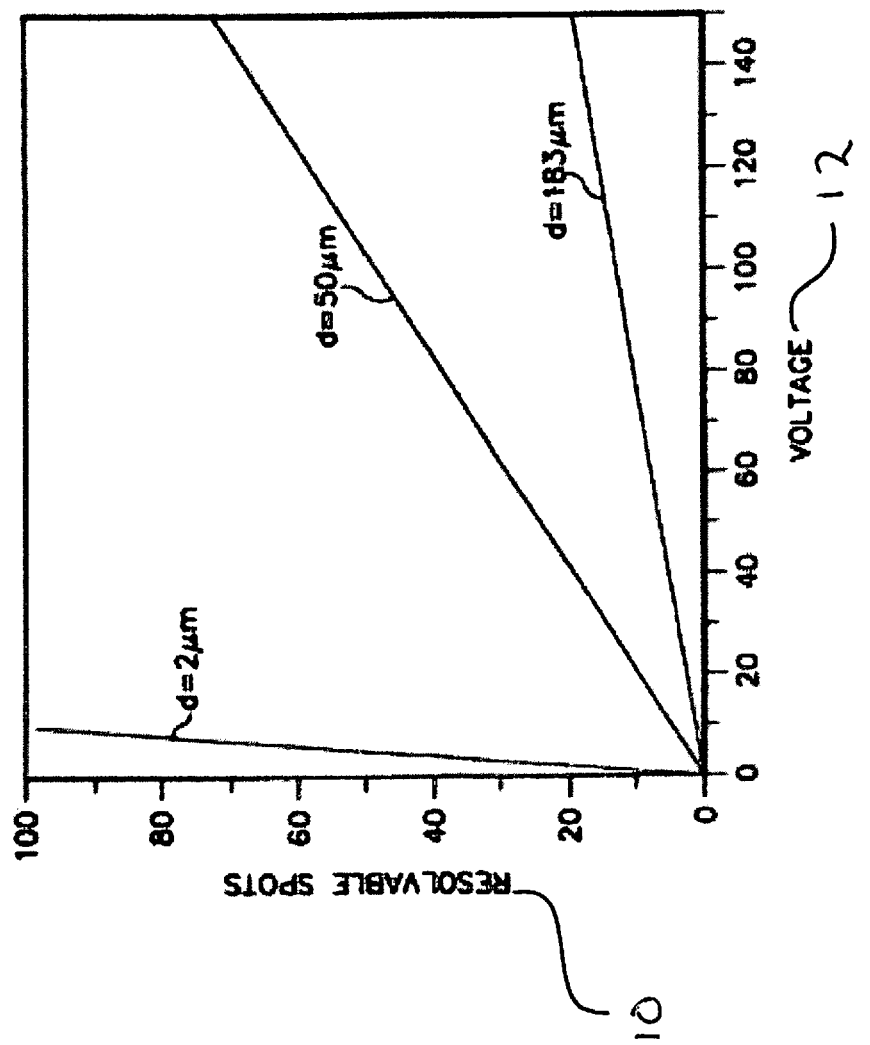
FIG. 7 a graphical representation of resolution as a function of applied voltage showing the resolvable number of spots and the diameter of the spots.

Yaacobi, et al., conveys an innovative advance in phased array wide-angle beam steering as noted in *Optics Letters*, vol. 39, no. 15 (2014), where a high-speed, low power and wide-scan-angle optical phased array is reported. The array is based on a novel phase shifting architecture. The approach utilizes 32 μm long grating-based antennas, fed through evanescent field waveguide couplers from a bus waveguide with directly integrated thermo-optic phase shifters. The demonstrated phased array is continuously steerable over a 51° angular range with a 10.6V signal. The average power dissipated in such a device is ~18 mW/antenna with a 3.2 dB cutoff speed of 100 kHz. Several notable advances of the state of the art at the time of publication are worth noting. Chief among them are the wide steering angle and very low power for such a deflection. The ability to operate at 100 kHz demonstrates on/off behavior that is much faster than LC materials and this device was also fabricated utilizing standard 300 mm silicon integrated circuit techniques are all significant advances. Here the use of a spectral comb enables multi-beam emission, thereby enabling 2-D scanning in a design that can be modified for any wavelength from 1.2-3.5 μm. The device can be economically mass-produced for use in automobile accident avoidance technology, but questionably. Although the device from Yaacobi, et al. is a suitable advance in beam scanning, in order to operate in a commercially viable way in the AV space, the solution must address the receiving problem. Their device fails just as the Vescent Technologies, Inc. device has—it cannot admit beams of arbitrary size and thus both suffer from large divergence, which accelerates as the signal to noise ratios decreases. FIG. 6 illustrates the evanescent field device architecture. Incoming signals (603) are steered by control signals entering the device (602) and generate a cone of potential signal angles (601) which can be directed to fill an aperture of a downstream optic, of limited size. Unusable for sending or receiving at high frequency and an even smaller aperture than current galvo technology. Furthermore, there are limitations in device scaling as suggested in FIG. 7, a graph of resolvable spots 10 vs voltage 12, and the active signal collection angle over which the device can be employed. The IFOV is too narrow for effective AV applications and is limited to applications where this is less problematic or the beams are highly directional.

To wit, the presence of side lobes also indicates a narrowed steering angle since there is no benefit in steering beyond the spacing of two consecutive beams. It has been variously defined, notably in Yaacobi et al., that the beam spacing, $\Delta\varnothing$, is the angle between the fundamental and the next order lobes. This angle can be derived by applying the first-order constructive-interference condition on the array's antennas with all of the antennas emitting at the same phase and it is related to the antenna pitch, d by the relationship $$\sin(\Delta\phi) = \frac{\lambda}{d} \quad (1)$$

where $\lambda$ is the laser wavelength. Thus increasing the angle between two consecutive lobes requires narrowing the antenna spacing. Unfortunately, since the antenna spacing needs to approach a half wavelength to achieve the full 180° steering range, approaching this range prevents the inclusion of other components in the interstitials between the antennas (such as phase shifters as in J. Sun, et al. *Nature* vol. 493, p. 195 (2013) and/or of waveguides to different antennas as in K. Acoleyen, et al., *Opt. Express* vol. 18, p. 13655 (2010). Given that silicon photonics is inherently two-dimensional, extracting other components from between the antennas limits the array to one dimensional electrical steering and forces long optical antennas to cover the necessary aperture size. In the longitudinal direction, i.e. along the antenna waveguides, the emission angle of the $N^{th}$ order $\theta_N$, in air, is given by $$\sin(\theta_N) = n_{eff} - \frac{N\lambda}{\Lambda} \quad (2)$$

where $n_{eff}$ is the wavelength effective index and $\Lambda$ is the grating period. This limits the broad applicability of that innovation and points to a need for an innovation where the electrical input components are not subject to such limitations and half $\lambda$ spacing of the drive electrodes is possible.

Figure 4:
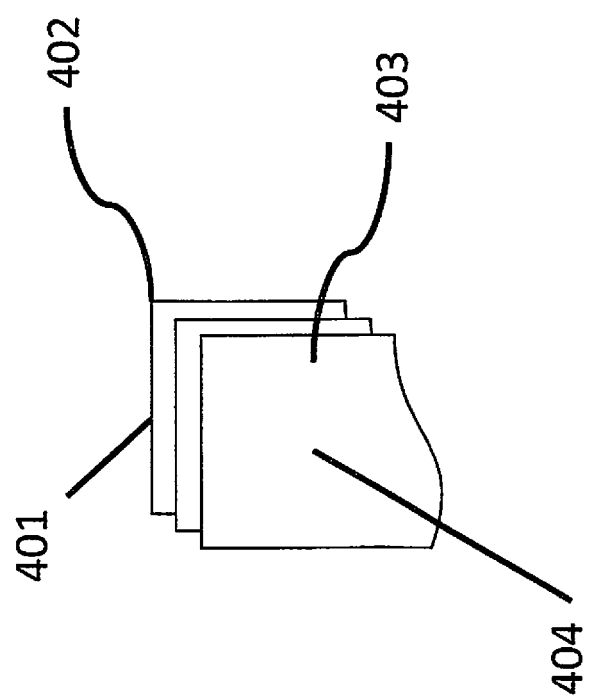
FIG. 4 is a conceptual representation of prior art Transmissive multi-layer beam steering waveguide typified by optical modulators using liquid crystal (LC) materials.
Figure 5:
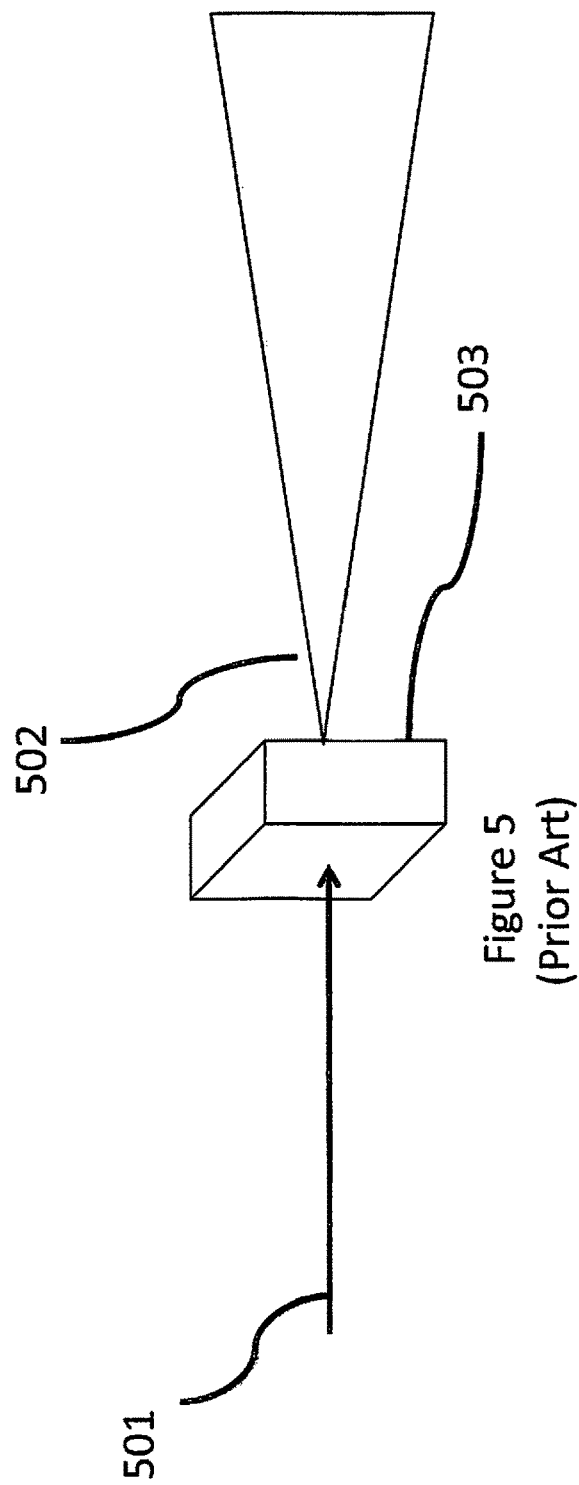
FIG. 5 is a conceptual representation of an AOM/AOD apparatus having a limited size aperture and field of regard and a very small steering angle, requiring long beam paths to affect any useful beam steering from a LIDAR perspective.

Acousto-optic deflection or modulation (AOD and AOM), FIG. 5, enable an input beam (501) to pass through the device (503) while the medium is stimulated to affect a change in index which moves the beam. Oscillating the incoming signal enables the beam to be steered in a single axis (502) resulting in a narrow cone angle. Since the effect is quite small, large beam paths are required to create a usable effect. Several multilayer devices based on LC architecture have been created, FIG. 4, where an incoming beam (404) passes through a first layer (403), subsequent layers and finally the last layer (402) to emerge in a different orientation that it entered (401), but the effect is limited in degree of deflection and is limited in its application to the reception of signals.

Broadly reviewing the field of non-mechanical beam steering, there are a number of categories into which the previous devices can be grouped, but typically these approaches did not lead to the desired large Lagrange invariant. Arrays of waveguides have also been investigated, e.g., in AlGaAs as described in F. Vasey, et al., *Appl. Optics*, vol. 32, pp. 3220-3332 (1994), but again waveguide arrays have a limited Lagrange invariant. Liquid crystal technologies are of particular interest because of the potential to achieve the large Lagrange invariants and at the same time can potentially be fabricated using well-established techniques for manufacturing liquid crystal displays, see A. Tanone, et al., *Microw. Opt. Technol. Lett.*, vol. 7, pp. 285-90 (1994). Liquid crystals approaches have been investigated for a considerable number of years since A. Fray, et al., in U.S. Pat. No. 4,066,334 completed his pioneering work in the field in 1978. Liquid crystals have high birefringence, so can steer by creating a large OPD for one polarization using relatively modest voltages. Liquid crystal devices have been fabricated to implement both variable blaze and variable period steering. The variable period approach used an array of piston phase shifters to approximate a saw tooth phase profile with 2r phase resets under electronic control. Steering time is typically on the order of milliseconds. While liquid crystal devices have several advantages, one important disadvantage has proven to be their steering efficiency at large angles. A result of the low efficiency is that alternate techniques have been investigated for steering to large angles, some of which have been discussed herein in detail and other by reference have been incorporated into this disclosure. The final steering system in systems such as these often consists of a liquid crystal optical phased array for continuous steering over small angles combined with an alternate technique that provides steering to a discrete number of larger angles. The combination results in a system with continuous steering over large angular range, but one burdened with limited scan ability in/above the 100 kHz regime, a necessary condition for broad application of non-mechanical beam steering in AV vision systems.

Of particular interest to the discussion of the present invention, is a device disclosed in U.S. Patent Application 2005/0225828A1 wherein a semiconductor material is imbued with quantum dots in order to effect electro-optic beam steering, which exhibits a larger Lagrange invariant, but is limited in application by steerable beam size, shows a limited span of control over the signal to be modulated and lacks the flexibility to be deployed in large phased array configurations required by LIDAR applications and the like. Additionally, the present invention alleviates the expense limitations associated with constructions of this sort by avoiding complex and time-consuming MOCVD, CVD or epitaxy. Most of these limitations are imposed on the device by virtue of its modulation schema requiring the signal to be confined within a waveguide in an era when the desired approach is a free space beam steering optic of innovative construction. Herein there exists a very important distinction between the prior art and the present invention: The present invention is concerned with beam steering over an extremely large range with virtually unlimited clear aperture, not with modulation of confined signals, per se and the ability to operate in either transmit or receive mode in a LIDAR system. Taking stock of the state of the art, it is instructive to investigate as many related inventions and techniques to examine the various schema used for manipulating the E-M field associated with light. The present invention compares to previous methods, but improves the state of the art in its ability to function as both a send and receive unit by virtue of large clear aperture and transmission mode operation at or above 100 kHz, and ideally into the MHz regime to provide multiple pulses in flight at any one time to improve the point cloud density for optimum signal:noise ratio. Many other inventors practice art that is based upon reflection mode modulation, which will suffice for transmission mode operation, it fails primarily due to polarization loss and efficiency where near single photon detection must be reliably achieved. Both U.S. Pat. Nos. 6,647,158 B2 and 6,836,351 B2 teach the modulation of light in waveguides by use of electro optical effects. Both suffer from limitations in capacitance and thus drive signal frequency. An improvement to this would embody drive frequencies >100 kHz in deployments related to LIDAR for transportation and navigation in AV systems.

The state of the art covers a wide array of intended applications, but few applications are specific to LIDAR systems for transportation. For all the incremental advancements, there are still a number of gaps in the current and prior art relative to the high performance requirements outlined herein. Nearly all of the prior art is restricted to applications where a high intensity beam is required over a narrow aperture. For transportation applications, it is very obvious that the eye safety limit for fluence/average power, will be rapidly exceeded under these conditions. The ideal solution would require pulse energy of less than 2 micro Joules (<2 µJ). The prior art is further limited to small beam diameter or small aperture. Solving these limitations to enable a beam-scanning receiver without moving parts would revolutionize the autonomous vehicle industry.

Figure two illustrates beam steering available in a wide array of waveguide and telecommunications applications. 201 illustrates the incoming signal and 202 the deflected signal (via the steering block, made of a variety of electro optical materials) guided to a variety of optical components coupled into the wave guiding medium. It has a low input aperture, slow scan speeds and ultimately no mechanism to usefully gather signals from the surrounding environs.

Having discussed the downfalls of the prior art and their counter indications for limited success as an element of a vision system for an autonomous vehicles, the novel vision system and beam scanner will now be discussed.

The present invention relates to a signal scanning system with very large aperture (up to 30 cm) and no moving parts for solving limitations presently inherent in LIDAR/RADAR systems for autonomous vehicle navigation systems (LAVNS or RAVNS). The increase in aperture is realized through the construction of a substantially transparent sheet of arbitrary size and subjecting the device to perturbation of the substrate's electro-magnetic properties while at the same time exposing the substrate to the desired wavefront (sending or receiving). The device does not rely solely on electro optical effects, crystal axis, waveguiding or any of a number of approaches presently employed for a variety of modulation schemes in telecommunications. All of the optical scanners presently contemplated or manufactured suffer from limitations in the size of the signal angle admitted by the device, which renders them unusable for LAVNS systems that approximate the manner in which typical gasoline powered vehicles operate, in the particular case of vision systems deployed into electric vehicle applications. There are two primary limitations of present solutions for sampling or scanning in LAVNS applications. One of the primary limitations is scanning rate and this limits the maximum speed achievable by autonomous vehicles (AVs). The other is the size of the optical elements collecting or disseminating the signals. The present invention overcomes both limitations as well as providing a means to overcome signal/noise ratio issues associated with realizing a maximum cone angle to provide the largest IFOV (instantaneous field of view) possible.

Figure 10:
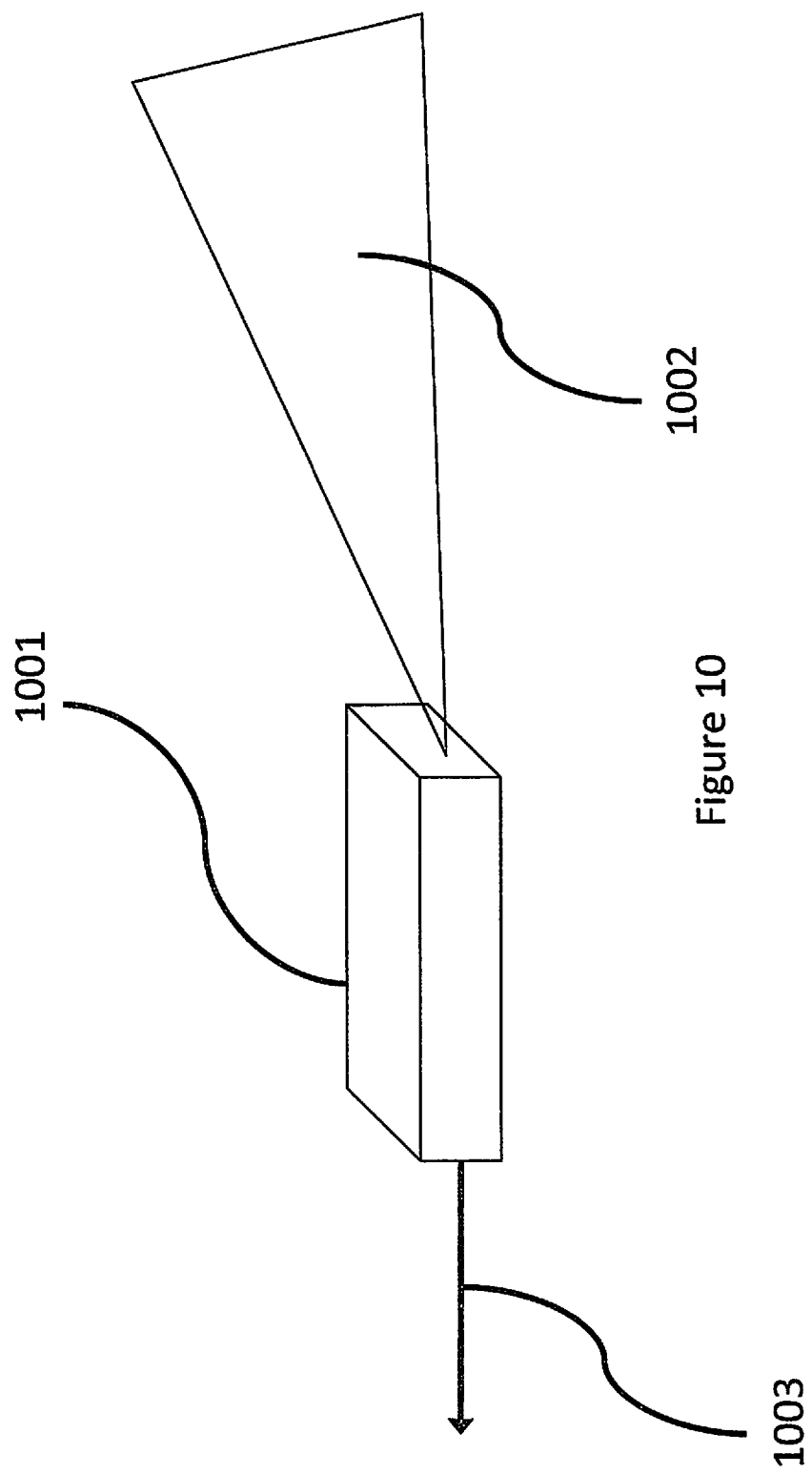
FIG. 10 is a conceptual representation of the beam scanner as a solid state device with beam steering capability 1000 times better than low entry angle devices with poor aperture, in both sending or receiving modes, capable of scan speeds >75 KHz.
Figure 12:
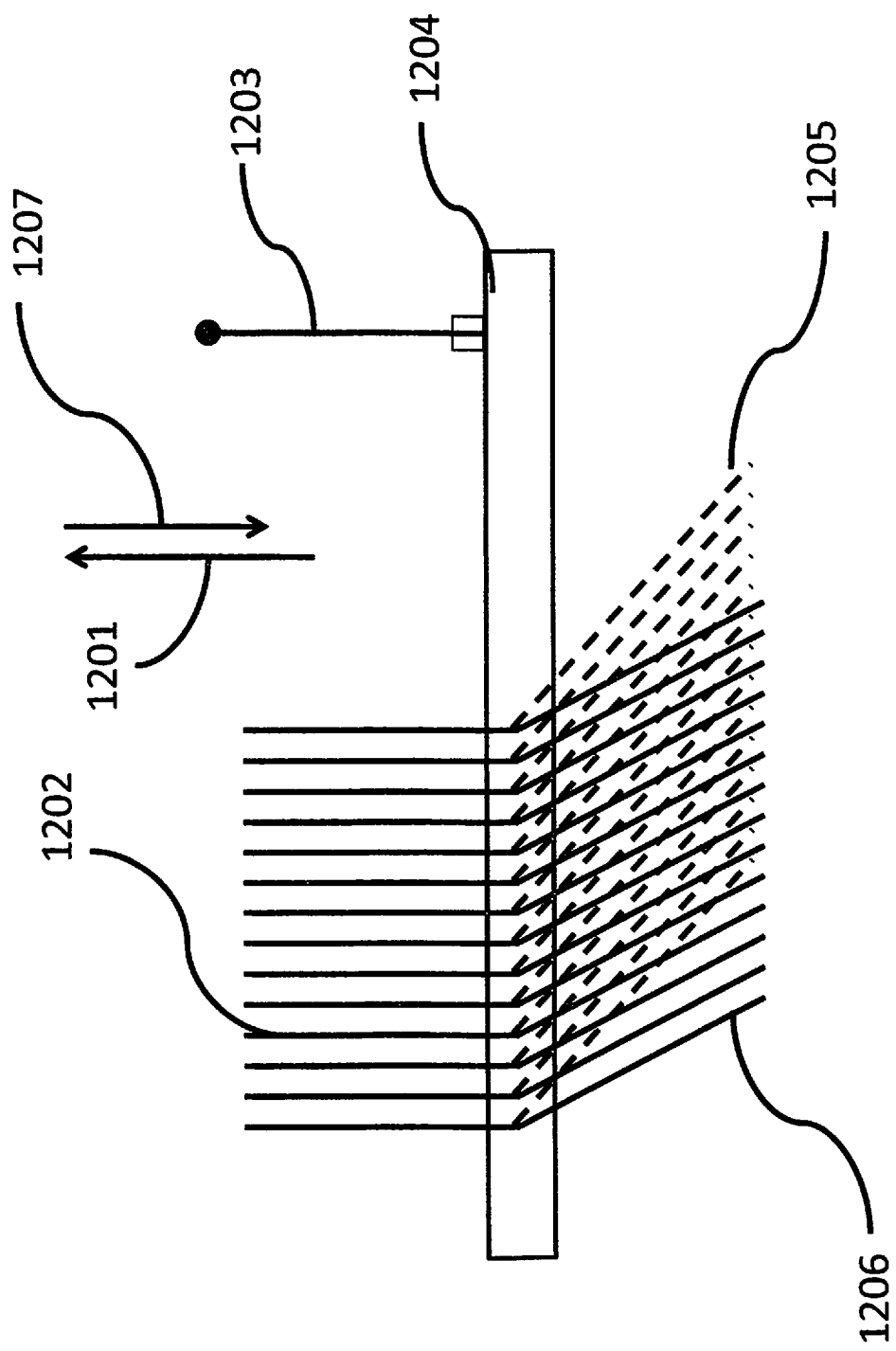
FIG. 12 is a conceptual representation of beam path alteration from ordered and collimated to variably angled (transmit mode) and from variably angled to collimated (reflect mode)

A variably polarizable, substantially transparent, optical element is embodied in the present invention to effect beam steering for use in autonomous transportation systems. By altering the internal electrical environment, the path of a light beam may be altered. The invention comprises supporting substrates between which at least one layer of a matrix containing particles capable of variably creating a dipole moment under stimulation are distributed. The size of the particles should ideally be smaller than 500 μm (but could be much larger and indeed of any size) and can be derived from metallic, organic, insulating or semiconducting materials. The volume fraction of the particles should be >5%, but is variable for each type of material, an optimum being defined by the particular application envisioned for the device and could even be as high as 90% loading by weight. The target LIDAR wavelength is 1550 nm and the ideal scanning speed is about 1 MHz, but should be at least 100 kHz to be useful and to distinguish this According to an aspect of the present invention, the available clear aperture of the device is greater than about 5 mm and can be as large as 10 inches, while still having low divergence, about 2.5 milli radians providing for built-in isolation and signal discrimination. The range of the ideal sender-receiver combination will exceed 200 meters and can be as large as 5 km. Conceptually, the beam scanner resembles FIG. 10, where signals reflected from arbitrary angles (1002) are collected by the stack of plates (1001) and directed along a single direction (1003) onto the detector. Looking for more clarity in terms of device operation, FIG. 12 illustrates how the beam scanner can operate in both send and receive modes (1201: receiving in-bound reflected signals and 1207: sending signals generated by the emitter and steering them through a wide range of randomly accessible angles). 1201 shows the signals and 1205/1206 those beamlets being steered through whatever angle the user desires by virtue of control signals (1203) supplied to the beam scanner (1204), as a summary of the operating embodiment.

Yet another aspect of the present invention comprises a control system for rastering the beam path across the entire device or within pre-defined regions or within "pixels", the size of which is defined only by the size of the control electrodes and the density of loading in the support matrix. The pre determined arrangement of the particles, quantum dots or molecular clusters with charge centers, for instance, would enable some control in the size and arrangement of the portions controllable by virtue of external inputs, effectively adjusting the granularity of the beam steering. In order to affect optimal coverage, ideally two devices would be included in the beam path and paired with cylindrical lenses behind each scanning matrix. The size and position of the lenses could be varied by application, but generally the beam scanning/steering device is positioned to deliver scanned/interrogated pixel/position information to a collecting optic of some ilk.

The device operates by creating localized dipole moments by virtue of an applied external field, which could be supplied by either direct current or alternating current at a sufficiently high duty cycle to affect beam steering at the desired scanning frequency as delivered by the external driver circuitry, minimally 2-5 kHz ideally up to 1 MHz. This enables a very interesting random pointing capability which opens the doors for a substantial increase in computational image analysis to further enhance the performance and safety of a vehicle thus equipped. Very high density optical data without being overly cumbersome on terms of size. High frame rates without a linear increase in pixel rates, regardless of wavelength being employed, since the beam scanner can be optimized for any wavelength desired. The components of the device minimally scatter or substantially transmit the 1550 nm radiation, being substantially transparent, but could operate at any wavelength longer than about 800 nm. The particle size has some influence on the size of the applied signal, but the particles need not be particularly small to experience very high field strength over a very short length scale. Given sufficiently high intensity, the non-linear contribution of the index of refraction can be influenced, inducing a change in wavefront direction, by applied electrical magnetic or optical signals. Interestingly enough, the effect can be observed by application of magnetic, thermal and optical excitation to the device, with varying degrees of magnitude. Each signal has an optimum choice for identify, loading, dispersion and patterning of the particles in the device. All devices would ideally be solid state devices in the preferred embodiment of an operational guidance system.

In one embodiment, The absorption spectrum of the supporting matrix, which need only be transparent to the 1550 nm radiation, and could thus be fashioned from amorphous silicon (Si), plastic or glass, is necessarily altered by the presence of the electric field. The inclusion of polarizble entities, molecules or particles or clusters of particles, amplifies this effect, thereby offering a means of solving the limitations of beam scanners used in LIDAR systems for autonomous transportation (AT). Beam scanning accomplished by means of physically moving objects is limited by scan speed (mass) and aperture (size). Applying the present innovation to a beam scanner that can receive signals from an arbitrarily large range of angles leads to a solution to the problem of self driving cars now being faced by every manufacturer presently testing them, whether by LIDAR or RADAR guidance system, all suffer the limitations imposed by moving masses, i.e. galvanometer scanners or others of that ilk, which ultimately limits vehicle speed and limits laser power due to eye safety requirements, even at 1550 nm.

Introduction of particles or polarizable molecules into a substantially transparent matrix, naturally alter the electronic behavior of the host material, if not at least, its internal electronic environment. It is by controlling how these particles are supplied to the matrix or applied to the surface of the matrix that the present innovation creates a device with no moving parts and an arbitrarily large aperture, capable of controllably steering incident electromagnetic radiation. The particles ideally would be supplied by electrospray techniques that render the particles covalently bonded to the surrounding medium and even one to another, but the effect can be demonstrated with simple spin-on techniques. The deposition technique renders the droplets containing the particles or molecules positively or negatively charged relative to the target substrates and this creates a means for creating charge separation within a matrix by building many layers of thus modified substrate plates. This charge separation can be controlled by judicious choice of process conditions to create permanent alteration of the electronic environs in a material, which means that the light beams can be effectively steered even without application of external control signals. This can be further enhanced or perturbed by the optional use of an externally applied signal, if desired, for instance an electric, magnetic or optical field. Use of quantum dots as a particle species, is an example of an embodiment of this innovation where by the field can be affected by using a light beam of different wavelength to effectively steer the beam through individual pixels or zones.

In the preferred embodiment of the invention, the substrates thus treated with the electrosprayed materials, now sufficiently imbued with centers of localized charge separation, are laminated together, forming a stack capable of deflecting the electromagnetic signal of interest through a pathway to bring the signal into or out of an aperture of an optical element mounted nearby, along an optical axis defined by the apparatus, such as a lens, and ideally a cylindrical lens—one for each axis of interest. Each desired axis of motion or axis of scanning for reflected signals, is served by such a device stack and a lens. In the preferred embodiment, the device comprises a pair of lenses and a pair of substrate stacks to effectuate collection of reflected signals from the outside environment through which the AV is navigating or otherwise sensing, measuring or interrogating. Ideally the control signals will be cycled across the device such that each region of the device can "look" at a variety of angles over the entire substrate, in a random fashion, such that the entire external region illuminated by the source, located on the AV, would be interrogated for reflected signals. Given the speed of light, to "look" downrange 200 meters, there is a window of 1-2 milliseconds in order to address or interrogate each point within the field of view. The rate would ideally be set to match the required time of flight associated with a desired pulse rate from the illuminating (emitting) source, with the intention of putting and keeping multiple (at least two) pulses in flight at all times before any two sequentially emitted pulses could have one of the pair detected by the receiver unit. The higher the rate the more light pulses could be placed "in flight" which increases the resolution of the picture obtained by the LIDAR system. The key innovation in using the particle approach is in the switching speed or scanning rate, which is ideally >100 kHz; a regimes presently served by no optical scanning device on the market—especially when one adds the additional restriction of needing an aperture as large as 2-5". In so doing, multiple pulses and the high scan speed deliver a very high-resolution picture of the environment. The key innovation is the ability to randomly address the beam for illumination and to randomly interrogate individual points for receiving in order to increase the frame rate without increasing the pixel rate. The resolution capability in sequentially scanned systems is inherently limited by the data handling capability of the system processing computer.

Figure 8:
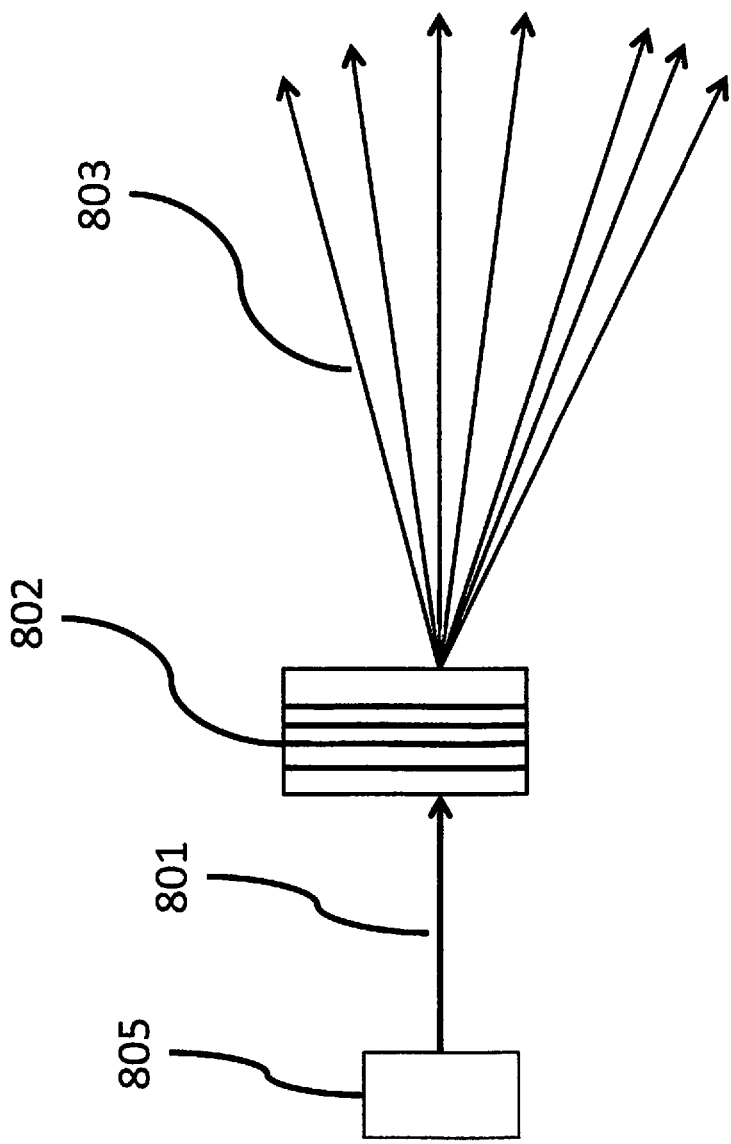
FIG. 8 is a conceptual representation of the transmitting mode of the beam scanner, showing a signal emitter, a lens and a substrate plate for creating random access pointing of an incoming signal for the purpose of high-speed (MHz) illumination of an environment external to an AV.
Figure 9:
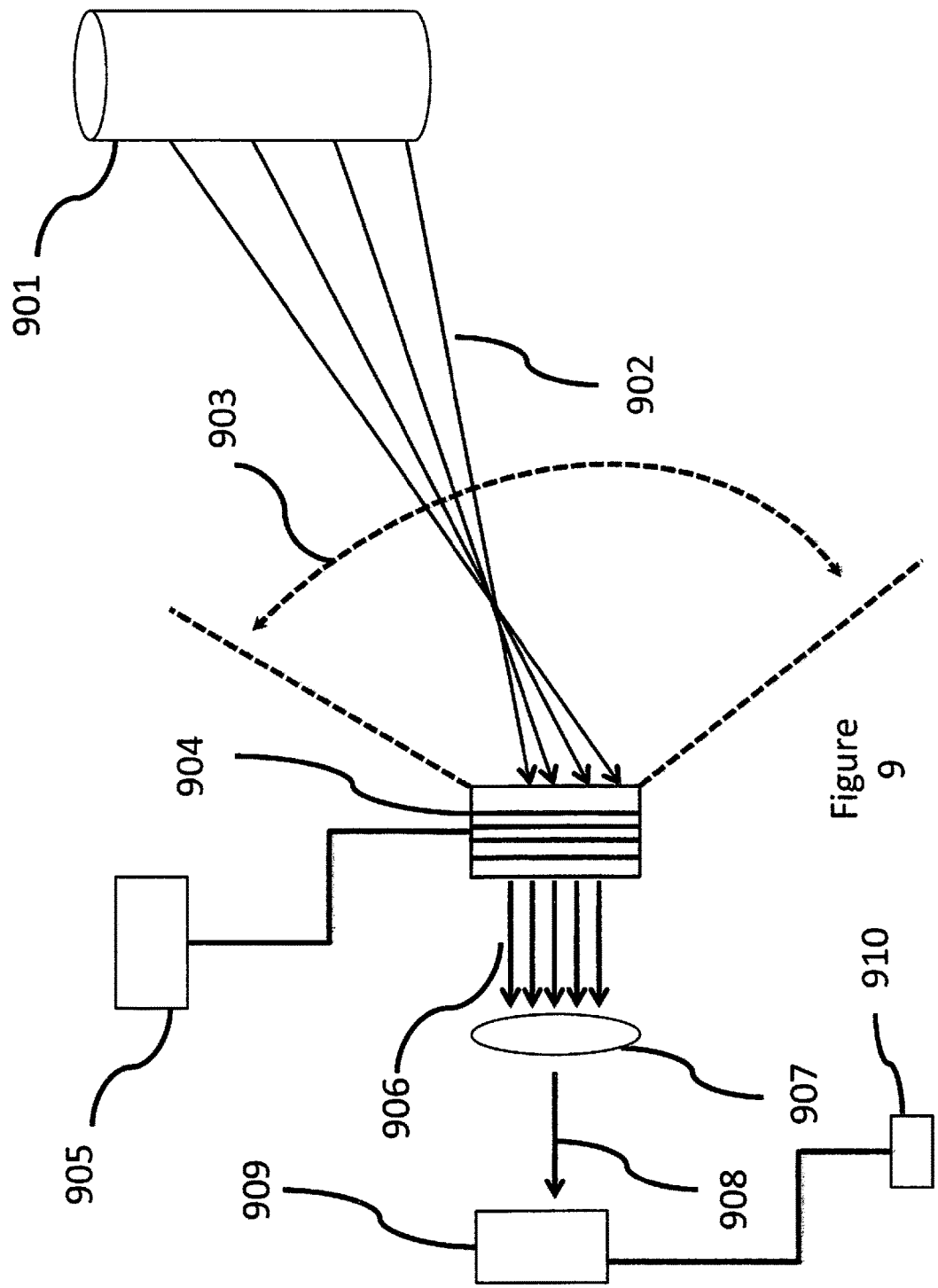
FIG. 9 is a conceptual representation of the reflection mode of the beam scanner where reflected signals are collected at arbitrary angles and directed onto a lens detector.
Figure 13:
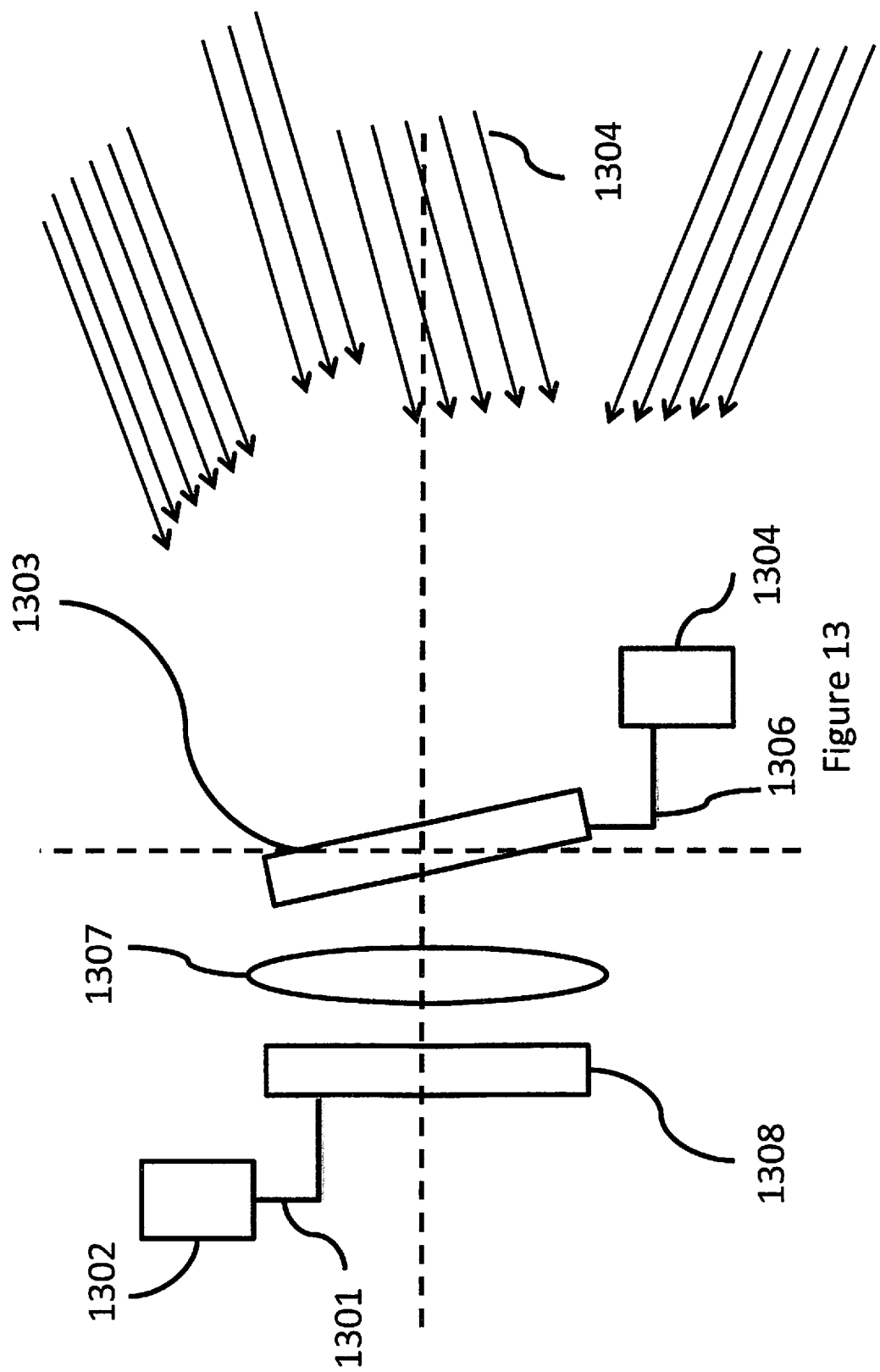
FIG. 13 is a conceptual representation of the beam scanner including beam scanner, lens, detector and microprocessor.
Figure 14:
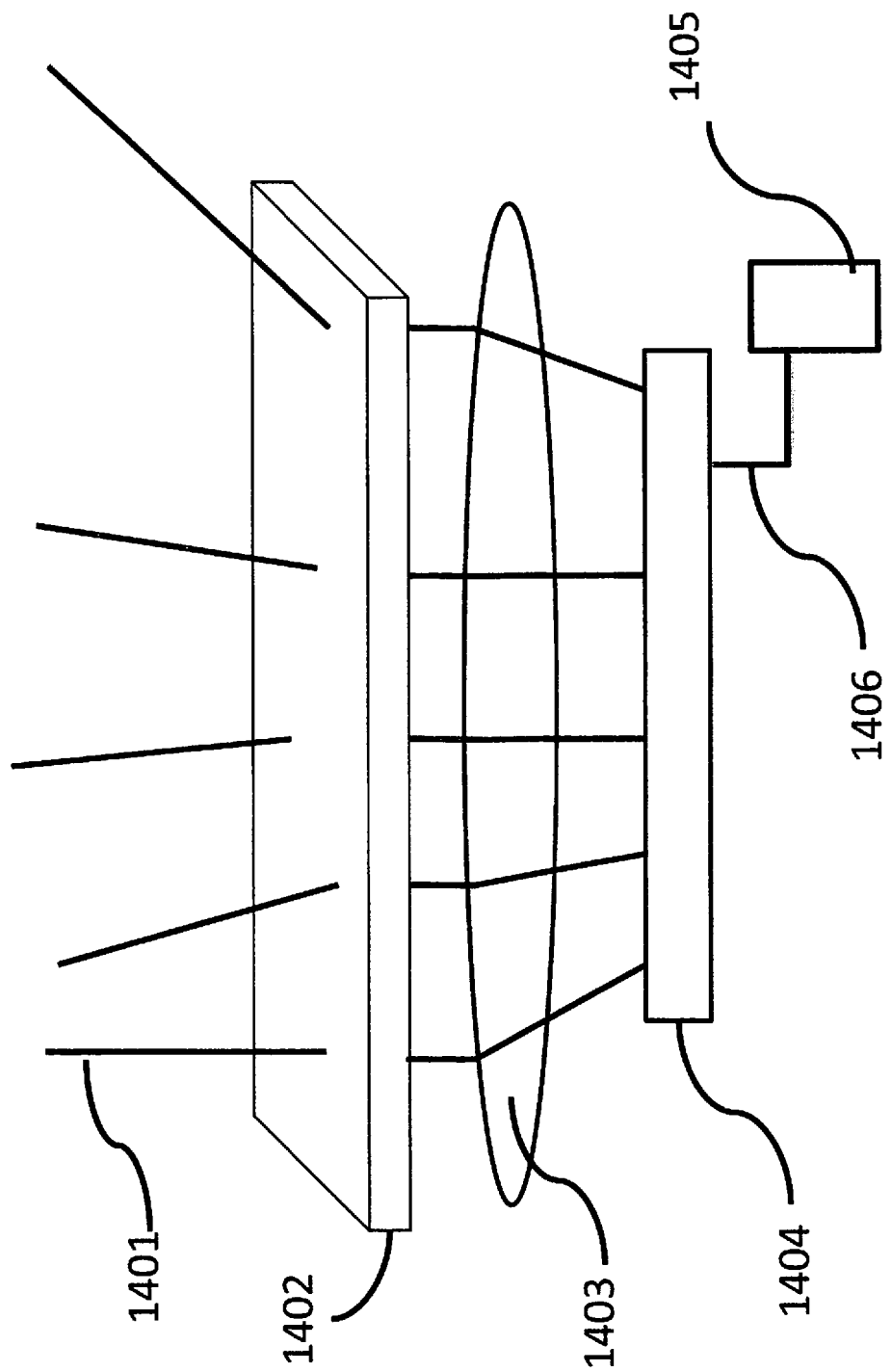
FIG. 14 is a conceptual representation of a detail, from FIG. 13, of the device and lens focusing variably reflected and incident beams onto the lens.
Figure 15:
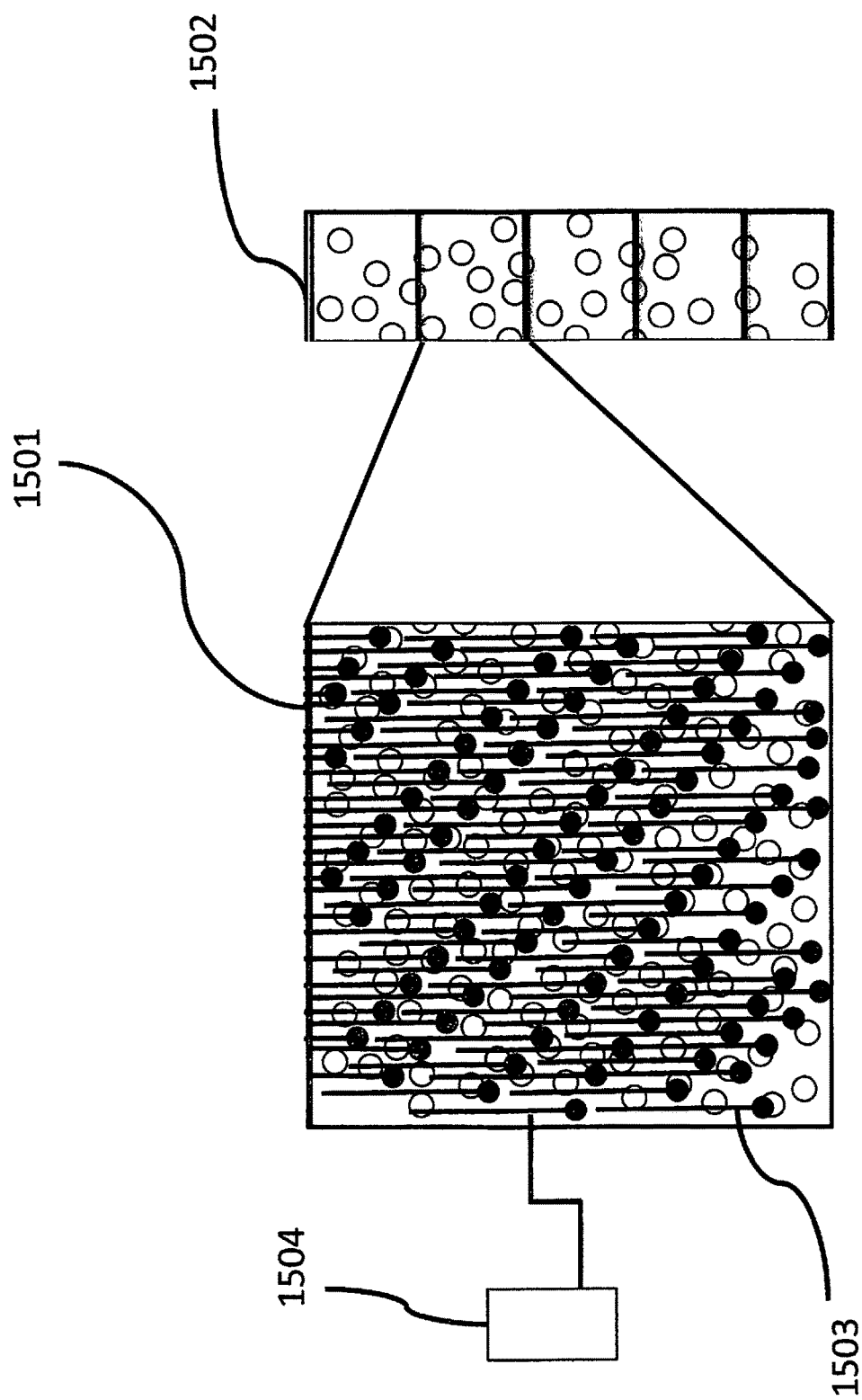
FIG. 15 is a conceptual representation of the planar face of any layer of the beam scanner represented in cross-section as well.

In the preferred embodiment for the AV application, the substrates would be no more than 5 mm thick and ideally each element would require only 3 stacks, although as many as 50 can be envisioned for certain applications. The stacks would be roughly 6 inches on a side, to form a rectangular or elliptical window through which the incident light would travel en route to the detector. The desired embodiment is indicated in FIG. 13. An operational guidance system (all components in FIG. 13) for providing an output signal (1301) to a processing unit (1302) responsible for the generation of a drive signal for the moving control of an autonomous vehicle, said operational guidance system having no moving parts, comprising: at least one beam scanner (1303) for the collection of an electromagnetic signal pulse (13040 sent by a signal emitter and reflected by an environment external to said autonomous vehicle; a controller (1305) applying an external control signal (1306) to said beam scanner to direct said collected electromagnetic signal pulse, to at least one lens (1307); said at least one lens positioned between said beam scanner and a signal receiver (1308), said collecting optic (1403), FIG. 14, shows a close up of the beam scanner and receiver, communicating said collected electromagnetic signal pulse (1401) onto said signal receiver (1404); at least one said signal receiver; and wherein said beam scanner (1402) is a substantially transparent and partially conductive substrate plate having at least one generally planar face thereon (802) with a series of particles affixed with said plate FIG. 11, each of said particles (1104) of an arbitrary size, and each of said particles possessing an induced dipole moment, and each of said particles in electrical contact (1102) with said partially conductive substrate plate (1103); wherein said signal receiver (1404) generates an output signal (1406) communicated to said processing unit (1405) of said autonomous vehicle. Furthermore, The operational guidance system above further comprising: at least one signal emitter (all of FIG. 8) generating said electromagnetic signal pulse (801) to illuminate said environment external to said autonomous vehicle (803). The emitter further comprising, a controller (804), a solid state emitter (805) illuminating the environment external to the AV using light from 800 nanometers to 2000 nm, being drawn from a variety of potential laser light sources, with the MIXSEL being ideal because of its pulse encoding capability, but also diodes, solid states lasers VECSEL, VCSEL or a fiber laser as long as their subsequent pulse duration is 50 ns to 0.5 fs. Furthermore, the ideal embodiment, possesses an external control signal with a scan rate determined as the number of control signals generated per unit time, with the scan rate at a frequency between 100 kHz and 10 GHz. Ideally the operational guidance system (FIG. 9) would reflect emitted signals from objects in the environment (901) and have a field of view (FOV) defined by the angle through which these reflected electromagnetic signals (902) are collected, up to and through an angle (903), up to 180 degrees, relative to the device face, further comprising a beam scanner (for receiving) (904) operationally connected to a controller (905) to supply the input aperture signals (906) steered to the lens (907) by (904) so that the now directed signals (908) are received by the detector (909), which is a diode or other semiconducting device supplying the processing unit (910) of the AV with an output signal from the detector. That output signal (from the detector to the processing unit) is generated by the signal receiver (909) and is proportional to a time delay between when electromagnetic signal pulse is generated by the signal emitter (805) and when the electromagnetic signal pulse is reflected by the environment and is received by the mentioned signal receiver. The signal emitter ideally has a pulse repetition frequency of 1 kHz to 100 MHz. The particles in the beam scanner (FIG. 15) can be arranged on, in or next to (1501) any number of dielectric plates (1502, device cross section) that are in electrical contact (1503) with one another and with the controller (1504).

Figure 11:
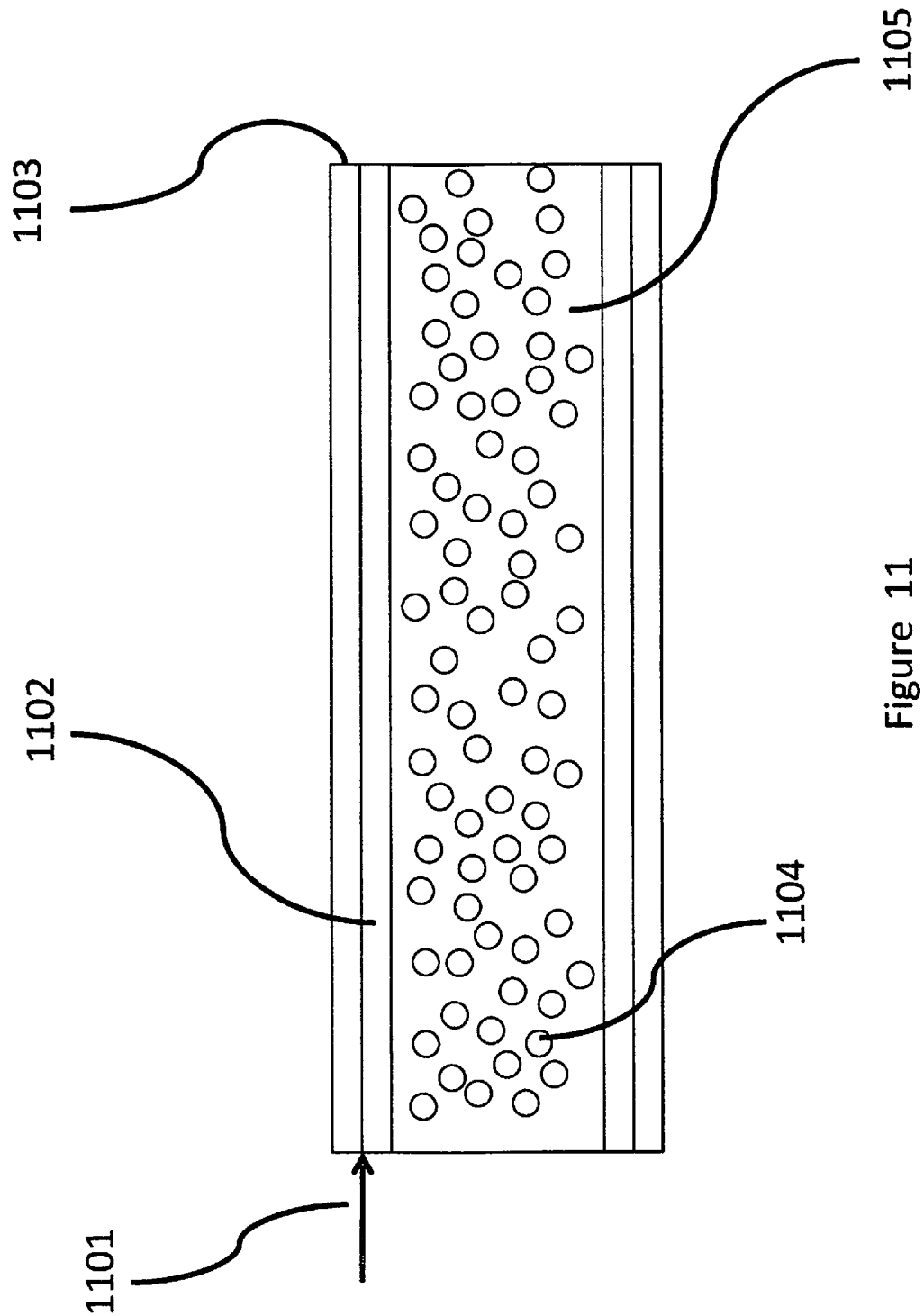
FIG. 11 is a conceptual illustration of the beam scanner where a signal can be applied to the device structures to create an alternate beam path through the matrix supplied with point sources of charge separation to generate both permanently polarized regions as well as variably polarized regions of material to adjust the angle through which the signal travels, being steered, in reflection mode, to the detector.

Ideally the device will modulate the beam path through the stack (1103) as conceptually presented in FIG. 11, (where 1105 is a magnified cross-section of the device for clarity) by way of modified polarization via the particles (1104) and applied control signals (1101), in each segment of the device to collect and direct the incoming signals onto a detector at frequencies of 100 kHz to 1 MHz. The Aperture will enable an IFOV which will be fixed to accommodate 2 mRadians or better, which will enable low error rates nominally on the order of 1.5 kHz, to enable built-in isolation and discrimination. The ideal embodiment will contain cells within the device that can be addressed independently of their neighbors, providing a pixel density of 8-10 megapixels across the 6"×6" device face. The device so assembled, would very easily advance AV sensing technology by solving all of the technical problems presently preventing widespread deployment, increasing the maximum speed of the vehicle, increasing the sensitivity, requiring a lower power laser source, up to 100 times less, and finally increasing the signal to noise ratio of the entire system. Using a vertical external (or internal)-cavity surface-emitting laser (VECSEL) and especially a mode-locked integrated external-cavity surface emitting laser, would, as a result of so-called quantum noise, enable fingerprint recognition of individual pulses. This would enable discrimination detection between many pulse sources occupying the same spatial volume. Thus enabled, the vision system would ignore the pulses not containing the pre recorded quantum noise footprint, greatly reducing or even eliminating the error rate/or false positive rates. This effect would be most efficacious in the picosecond or femtosecond pulse regimes. The other advantage of these laser structures is their very small size, weight and power consumption profiles Ideally the wavelength for which the device is optimized will be in the so-called eye safe region of the electromagnetic spectrum, preferably at or around 1500 nm, although the device need not be restricted to any particular wavelength. Each application will be optimized based on end-user goals. The preferred embodiment for AV applications with LIDAR sensing technology is a laser diode or other laser as described above, laser operating from 800 nm to 2500 nm, but ideally at 1550 nm, with a variable pulse repetition frequency from 100 kHz to 1 MHz or beyond. The reflected signal mode is the preferred mode of operation for the device and as such the preferred embodiment of the invention includes cylindrical lenses, one for each axis, to enable collection of incoming signals, captured by the matrix elements and steered by the application of control signals or passively by virtue of the design, without external control signals, to the clear aperture of the lenses, which subsequently focus the signals onto the detector, which in the preferred embodiment is a specialized compound semiconductor device, but could just as easily be an inexpensive PIN diode, with less than 20 photon sensitivity. This input would be converted into information about the AV's environment and then into control inputs to alter the AV's trajectory, course, speed or velocity alone or in concert.

Naturally, the particles within the scanner, on, in or near its component parts, can be arranged in predetermined patterns to affect a greater change in the electronic environment with the scanner, thus imparting a higher degree of deflection to the incident signals. The operational guidance system previously described would also have a field of regard that corresponds to an input aperture from 2 mm up to 1 meter in diameter, based upon the dimensions of said substrate plate. Furthermore, an ideal embodiment would include a signal emitter and receiver, a scanner and controller, as previously described, where all are solid-state devices. This in conjunction with a high scan speed would enable time delay proportional signals to be generated with the highest point density wherein at all times during operation, there will be at least two sequentially emitted electromagnetic signal pulses that have not yet been collected by said beam scanner. The scanner comprising particles that are quantum dots affixed theron said substrate plate and also therein said substrate plate. This can be deployed as described, but also as an integrated set of components as follows (FIG. 16): An operational guidance system for providing an output signal to a processing unit responsible for the generation of a drive signal for the moving control of an autonomous vehicle, the operational guidance system having no moving parts, made of at least one signal emitter (1601) generating the electromagnetic signal to at least one lens; at least one beam scanner for directing the electromagnetic signal on to an input aperture of a collecting or focusing optic; at least one first beam scanner for sending the electromagnetic signal (1602) to be reflected by the environment (1606); at least one first controller applying a first external control signal to the first beam scanner to direct the electromagnetic signal to the environment external to the autonomous vehicle; at least one second beam scanner for the collection of the electromagnetic signal reflected by an environment external to the autonomous vehicle; at least one second controller applying a second external control signal to the second beam scanner (1604) to direct the collected electromagnetic signal (1603) to at least one collecting optic; said at least one second lens positioned between the second beam scanner and a signal receiver, the collecting optic or lens communicating the collected electromagnetic signal onto the signal receiver; at least one signal receiver. Wherein the first and said second beam scanners are substantially transparent and partially conductive substrate plates having at least one generally planar face thereon each plate, with a series of particles affixed with each plate, each of the particles having an arbitrary size, and each of the particles possessing a induced dipole moment, and each of the particles in electrical contact with the partially conductive first and second substrate plates; wherein the signal receiver generates an output signal communicated to the processing unit of the autonomous vehicle (1605).

It is recognized that the primary components for the sending and the receiving apparatus are identical to one another, the only difference in the embodiments being the direction of the signal propagation, a detector where an emitter would otherwise be and the operational position of some of the optical components. Ideally the output signal generated by the signal receiver of this embodiment will be proportional to a time delay between when the first electromagnetic signal pulse is generated by the signal emitter and when the first electromagnetic signal pulse, as reflected by the environment, is received by the signal receiver. Part of the novelty of this operational guidance system is that at all times during operation, there will be at least two sequentially emitted electromagnetic signal pulses that have not yet been collected the beam scanner.

In one of the embodiments of the operational guidance system the particles are quantum dots. These dots or series of series of quantum dots are affixed on or in the substrate plate.

The laser scanning features of the present innovation rely upon the application of control signals for variable mode operation and can be also hard-wired into the matrix substrate by judicious creation of zones of polarization within the substrate through which the light travels. The electromagnetic environment is altered by the creation of zones of graduated concentrations of polarizable moieties, exhibiting a permanent dipole moment, or those that are electrically neutral in their quiescent state, by virtue of the conditions used in the electrospray deposition, which create covalent bonding between the substrate and the particles, molecules or clusters of molecules, depending upon the degree of polarization desired.

Figure 16:
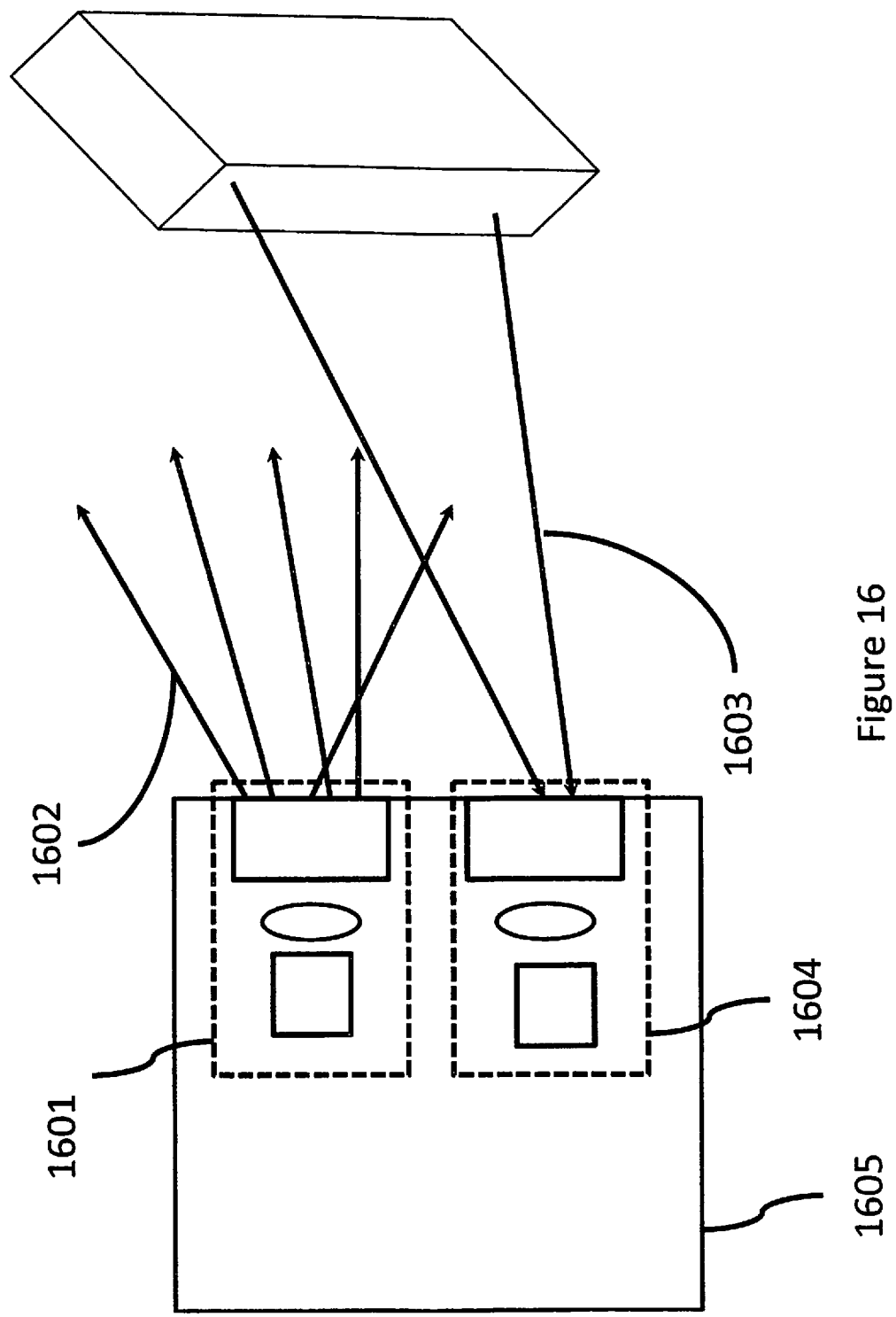
FIG. 16 is a conceptual view of the vehicle containing both sending and receiving units, the external environment from which reflected signals are detected and the send and receive subsystems that can be used alone or in concert.

The device in its preferred arrangement, consists of a laser source, being scanned across the field of view at a maximum scan rate in order to put at least two pulses into flight toward the target in order to increase the signal to noise ratio, which has the added benefit of increasing the resolution of the picture produced by the reflected laser radiation used for obstacle detection, lane maintenance and obstacle/collision avoidance and target acquisition. In the reflected mode example, the innovation enables a compelling commercial solution by delivering a LIDAR solution capable of interrogating the surrounding environment enabling safe, high-speed operation of the vehicle, in a performance window very much like that enjoyed by vehicles presently commonly in use. FIG. 16 provides a suitable conceptual layout of an embodiment of the invention comprising the vehicle's envelope (1605) and an object in the external environment (1606) the sending module, as previously described (1601) the receiving module, as previously described (1604), emitted electromagnetic signals (1602) and reflected electromagnetic signals (1603) containing information about the external environment. Of course the sending and receiving units can be deployed together or separately, but the ideal solution would comprise both beam scanning modules and the supporting elements as described herein.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed:

1. An operational guidance system for providing a signal receiver output signal to a processing unit responsible for the generation of a drive signal for the moving control of an autonomous vehicle, said operational guidance system having no moving parts, comprising:
    at least one said signal receiver;
    at least one beam scanner for the collection of an electromagnetic signal pulse sent by a signal emitter and reflected by an environment external to said autonomous vehicle;
    a controller applying an external control signal to said beam scanner to direct said collected electromagnetic signal pulse, to at least one lens;
    said at least one lens positioned between said beam scanner and said signal receiver, a collecting optic communicating said collected electromagnetic signal pulse onto said signal receiver;
    and
    wherein said beam scanner is a substantially transparent and partially conductive substrate plate having at least one generally planar face thereon with a series of particles affixed with said substantially transparent and partially conductive substrate plate, each particle in said series of particles of an arbitrary size, and each of said particles possessing an induced dipole moment, and each of said particles in electrical contact with said substantially transparent and partially conductive substrate plate;
    wherein said signal receiver generates a signal receiver output signal communicated to said processing unit of said autonomous vehicle.

2. The operational guidance system of claim 1 further comprising:
    at least one signal emitter generating said electromagnetic signal pulse to illuminate said environment external to said autonomous vehicle.

3. The operational guidance system of claim 2 wherein said electromagnetic signal pulse emitted has a wavelength between 800 nm and 2000 nm.

4. The operational guidance system of claim 2 wherein the at least one signal emitter is chosen from the set of light sources comprising a diode laser, MIXSEL, VECSEL, VCSEL, diode pumped solid state or fiber laser with a pulse duration between 50 nano seconds and 0.5 femto seconds.

5. The operational guidance system of claim 1 wherein said external control signal has a scan rate determined as the number of control signals generated per unit time, said scan rate having a frequency between 10 KHz and 10 GHz.

6. The operational guidance system of claim 1 wherein said at least one lens has a field of view up to 180 degrees.

7. The operational guidance system of claim 1 wherein said signal receiver is a semiconductor device.

8. The operational guidance system of claim 1 wherein said output signal generated by said signal receiver, is proportional to a time delay between when said electromagnetic signal pulse is generated by said at least one signal emitter and when said electromagnetic signal pulse as reflected by said environment is received by said signal receiver.

9. The operational guidance system of claim 1 wherein said at least one signal emitter has a pulse repetition frequency of 1 kHz to 100 MHz.

10. The operational guidance system of claim 1 wherein said series of particles are affixed thereon said substantially transparent and partially conductive substrate plate.

11. The operational guidance system of claim 1 wherein said series of particles are affixed therein said substantially transparent and partially conductive substrate plate.

12. The operational guidance system of claim 1 wherein each particle in said series of particles possesses a permanent dipole moment.

13. The operational guidance system of claim 1 wherein said series of particles are arranged in a predetermined pattern.

14. The operational guidance system of claim 1 wherein the field of regard of the beam scanner corresponds to an input aperture from 2 mm to 1 meter in diameter, based upon dimensions of said substrate plate.

15. The operational guidance system of claim 2 wherein said beam scanner, said controller, said signal receiver, and said signal emitter are all solid state devices.

16. The operational guidance system of claim 8 wherein at all times during operation, there will be at least two sequentially emitted electromagnetic signal pulses that have not yet been collected by said beam scanner.

17. The operational guidance system of claim 1 wherein each particle of said series of particles are quantum dots.

18. The operational guidance system of claim 17 wherein each quantum dot of said series of quantum dots are affixed thereon said substantially transparent and partially conductive substrate plate.

19. The operational guidance system of claim 18 wherein each quantum dot of said series of quantum are affixed therein said substantially transparent and partially conductive substrate plate.

20. An operational guidance system for providing an operational guidance output signal to a processing unit responsible for the generation of a drive signal for the moving control of an autonomous vehicle, said operational guidance system having no moving parts, comprising:
   at least one signal emitter generating an electromagnetic signal to at least one lens;
   at least one beam scanner for directing said electromagnetic signal on to an input aperture of a collecting or focusing optic;
   at least one first beam scanner for sending said electromagnetic signal to be reflected by said environment;
   at least one first controller applying a first external control signal to said first beam scanner to direct said electromagnetic signal to said environment external to said autonomous vehicle;
   at least one second beam scanner for the collection of said electromagnetic signal reflected by an environment external to said autonomous vehicle;
   at least one second controller applying a second external control signal to said second beam scanner to direct said collected electromagnetic signal to at least one collecting optic;
   said at least second lens positioned between said second beam scanner and a signal receiver, said collecting optic or lens communicating said collected electromagnetic signal onto said signal receiver;
   at least one said signal receiver; and
   wherein said at least one first beam scanner and said at least one second beam scanner are substantially transparent and partially conductive substrate plates having at least one generally planar face thereon each said substantially transparent and partially conductive plate, with a series of particles affixed with each said substantially transparent and partially conductive plate, each particle of said series of particles of an arbitrary size, and each particle of said series of particles possessing a induced dipole moment, and each particle of said series of particles in electrical contact with said substantially transparent and partially conductive first and second substrate plates;
   wherein said signal receiver generates a signal receiver output signal communicated to said processing unit of said autonomous vehicle.

21. The operational guidance system of claim 18 wherein said signal receiver output signal generated by said signal receiver, is proportional to a time delay between when said first electromagnetic signal is generated by said signal emitter and when said first electromagnetic signal pulse as reflected by said environment is received by said signal receiver.

22. The operational guidance system of claim 19 wherein at all times during operation, there will be at least two sequentially emitted electromagnetic signal pulses that have not yet been collected said beam scanner.

23. The operational guidance system of claim 21 wherein said series of particles are a series of quantum dots.

24. The operational guidance system of claim 23 wherein said series of quantum dots are affixed thereon said substantially transparent and partially conductive substrate plates.

25. The operational guidance system of claim 24 wherein said series of quantum dots are affixed therein said substantially transparent and partially conductive substrate plates.

* * * * *